United States Patent
Alef et al.

(10) Patent No.: US 10,850,480 B2
(45) Date of Patent: Dec. 1, 2020

(54) CLOSED CONTAINER, IN PARTICULAR A FOODSTUFF CONTAINER, HAVING A SHAPING COEFFICIENT

(71) Applicant: SIG TECHNOLOGY AG, Neuhausen am Rheinfall (CH)

(72) Inventors: Ulrich Alef, Wegberg (DE); Horst Pawelczyk, Aldenhoven (DE); Stefan Schnorr, Düren (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 123 days.

(21) Appl. No.: 16/304,569

(22) PCT Filed: May 25, 2017

(86) PCT No.: PCT/EP2017/000620
§ 371 (c)(1),
(2) Date: Nov. 26, 2018

(87) PCT Pub. No.: WO2017/202494
PCT Pub. Date: Nov. 30, 2017

(65) Prior Publication Data
US 2019/0299576 A1      Oct. 3, 2019

(30) Foreign Application Priority Data

May 27, 2016   (DE) .................. 10 2016 209 237
Dec. 26, 2016  (CN) .................... 2016 1 1218497
Dec. 26, 2016  (CN) .................... 2016 2 1437302 U

(51) Int. Cl.
*B32B 27/10*    (2006.01)
*B31B 50/26*    (2017.01)
(Continued)

(52) U.S. Cl.
CPC .............. *B32B 27/10* (2013.01); *B31B 50/25* (2017.08); *B31B 50/26* (2017.08); *B32B 7/12* (2013.01);
(Continued)

(58) Field of Classification Search
CPC ........... B32B 27/10; B32B 50/26; B32B 7/12; B32B 15/085; B32B 15/14; B32B 27/08;
(Continued)

(56) References Cited

U.S. PATENT DOCUMENTS

2011/0192113 A1   8/2011   Kinoshita et al.
2013/0196102 A1   8/2013   Wolters et al.

FOREIGN PATENT DOCUMENTS

| WO | 2010023859 A1 | 3/2010 |
| WO | 2011091987 A1 | 8/2011 |
| WO | 2016001081 A1 | 1/2016 |

OTHER PUBLICATIONS

International Search Report and Written Opinion issued in related International Application No. PCT/EP2017/000620 dated Jul. 27, 2017.

(Continued)

*Primary Examiner* — Michael C Miggins
(74) *Attorney, Agent, or Firm* — Meunier Carlin & Curfman LLC

(57) ABSTRACT

The invention relates to a closed container, delimiting an interior from an exterior, wherein the closed container comprises a sheetlike composite; wherein the sheetlike composite comprises a layer sequence, comprising as mutually superposed layers in a direction from an. inner face of the sheetlike composite to an outer face of the sheetlike composite a) an inner polymer layer, b) a barrier layer, and c) a carrier layer; wherein the closed container is characterised by a shaping coefficient, determined according to the
(Continued)

Figure 1:
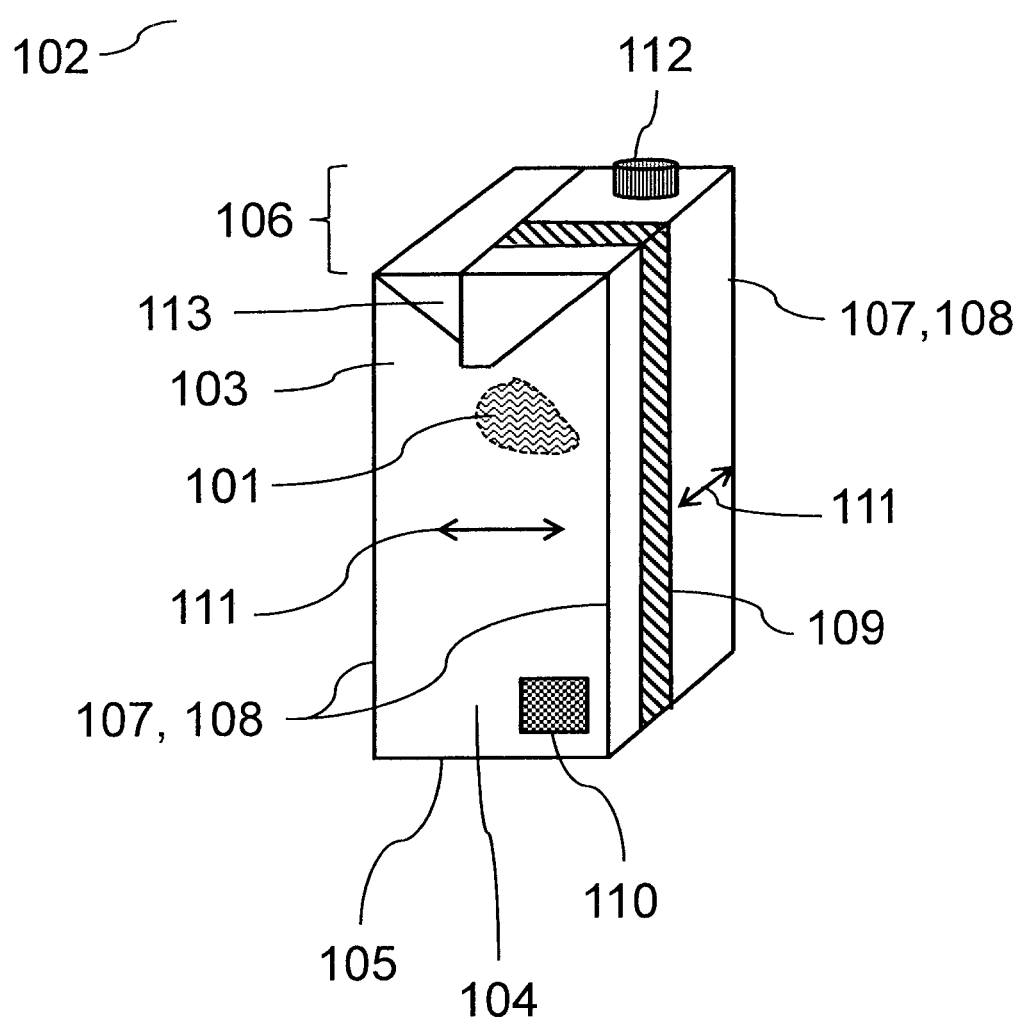

method described herein, in the range from 1.0 to 10.0 m²/kg. Further, the invention relates to a method by which a closed container with a shaping coefficient is obtainable; to the closed container obtainable by this method; to an apparatus, designed for producing one of the afore- mentioned closed containers; to a use of a sheetlike composite for producing one of the afore- mentioned closed containers; and to a use of one of the aforementioned closed containers for storing a foodstuff.

16 Claims, 13 Drawing Sheets

(51) Int. Cl.
| | | |
|---|---|---|
| B32B 7/12 | (2006.01) | |
| B32B 15/085 | (2006.01) | |
| B32B 15/14 | (2006.01) | |
| B32B 27/08 | (2006.01) | |
| B32B 27/30 | (2006.01) | |
| B32B 27/32 | (2006.01) | |
| B32B 27/34 | (2006.01) | |
| B65D 5/06 | (2006.01) | |
| B65D 85/72 | (2006.01) | |
| B32B 15/20 | (2006.01) | |
| B32B 29/00 | (2006.01) | |
| B65B 3/02 | (2006.01) | |
| B65D 65/40 | (2006.01) | |
| B65D 75/08 | (2006.01) | |
| B65D 65/42 | (2006.01) | |
| B32B 15/12 | (2006.01) | |
| B65D 5/36 | (2006.01) | |
| B31B 50/25 | (2017.01) | |
| B31B 120/30 | (2017.01) | |
| B31B 100/00 | (2017.01) | |
| B65D 5/74 | (2006.01) | |
| B65B 43/26 | (2006.01) | |

(52) U.S. Cl.
CPC ............ *B32B 15/085* (2013.01); *B32B 15/12* (2013.01); *B32B 15/14* (2013.01); *B32B 15/20* (2013.01); *B32B 27/08* (2013.01); *B32B 27/306* (2013.01); *B32B 27/32* (2013.01); *B32B 27/327* (2013.01); *B32B 27/34* (2013.01); *B32B 29/00* (2013.01); *B65B 3/025* (2013.01); *B65D 5/064* (2013.01); *B65D 5/065* (2013.01); *B65D 5/36* (2013.01); *B65D 65/40* (2013.01); *B65D 65/42* (2013.01); *B65D 75/08* (2013.01); *B65D 85/72* (2013.01); *B31B 2100/0022* (2017.08); *B31B 2120/30* (2017.08); *B32B 2255/10* (2013.01); *B32B 2255/205* (2013.01); *B32B 2270/00* (2013.01); *B32B 2307/30* (2013.01); *B32B 2307/402* (2013.01); *B32B 2307/4023* (2013.01); *B32B 2307/514* (2013.01); *B32B 2307/536* (2013.01); *B32B 2307/546* (2013.01); *B32B 2307/7244* (2013.01); *B32B 2307/734* (2013.01); *B32B 2307/75* (2013.01); *B32B 2435/00* (2013.01); *B32B 2439/40* (2013.01); *B32B 2439/62* (2013.01); *B32B 2439/70* (2013.01); *B65B 43/265* (2013.01); *B65D 5/746* (2013.01)

(58) Field of Classification Search
CPC ..... B32B 27/306; B32B 27/327; B32B 27/34; B32B 15/20; B32B 27/32; B32B 29/00; B32B 15/12; B32B 2307/4023; B32B 2307/514; B32B 2307/7244; B32B 2439/62; B32B 2439/70; B32B 2255/10; B32B 2255/205; B32B 2435/00; B32B 2307/42; B32B 2307/546; B32B 2307/734; B32B 2307/536; B32B 2439/40; B32B 2307/30; B32B 2270/00; B32B 2307/75; B32B 2120/30; B32B 2100/0022; B65D 85/72; B65D 5/065; B65D 65/40; B65D 75/08; B65D 65/42; B65D 5/36; B65D 5/064; B65D 5/746; B65B 43/265; B65B 3/025
See application file for complete search history.

(56) References Cited

OTHER PUBLICATIONS

Office Action issued by Patent Office of the Cooperation Council for the Arab States of The Gulf, in connection to Application No. GC 2017-33447, dated May 12, 2019.

100

103

300

500

600

Figure 7a) 700 A-A
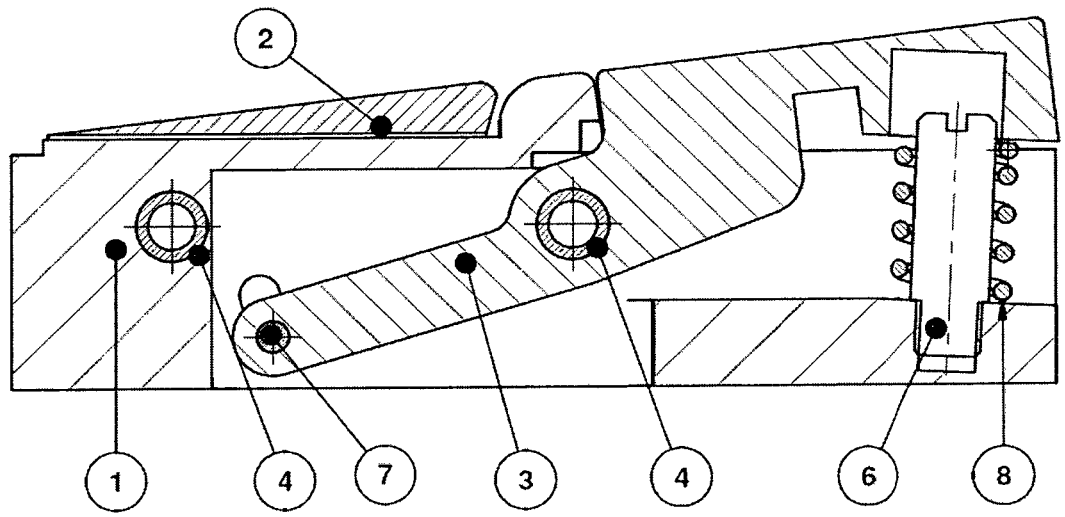
Figure 7b) 700 B-B
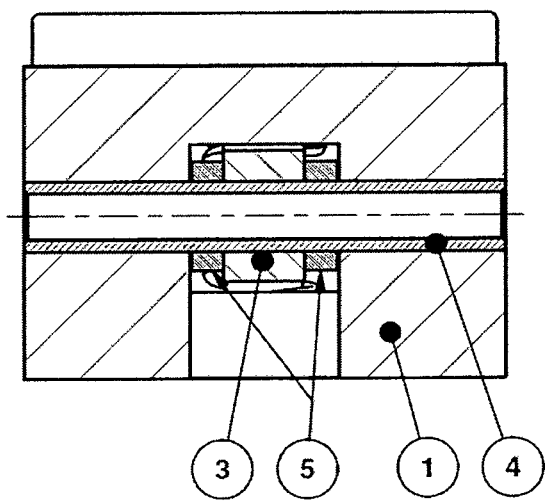

700

700

CLOSED CONTAINER, IN PARTICULAR A FOODSTUFF CONTAINER, HAVING A SHAPING COEFFICIENT

The invention relates to a closed container, delimiting an interior from an exterior, wherein the closed container comprises a sheetlike composite; wherein the sheetlike composite comprises a layer sequence, comprising as mutually superposed layers in a direction from an inner face of the sheetlike composite to an outer face of the sheetlike composite
  a) an inner polymer layer,
  b) a barrier layer, and
  c) a carrier layer;
wherein the closed container is characterised by a shaping coefficient, determined according to the method described herein, in the range from 1.0 to 10.0 $m^2/kg$. Further, the invention relates to a method by which a closed container with a shaping coefficient is obtainable; to the closed container obtainable by this method; to an apparatus, designed for producing one of the aforementioned closed containers; to a use of a sheetlike composite for producing one of the aforementioned closed containers; and to a use of one of the aforementioned closed containers for storing a foodstuff.

For a long time, foodstuffs, whether they be foodstuffs for human consumption or else animal feed products, have been conserved by storing them either in a can or in a jar closed by a lid. In this case, shelf life can be increased firstly by separately and very substantially sterilizing the foodstuff and the container in each case, here the jar or can, and then introducing the foodstuff into the container and closing the container. However, these measures of increasing the shelf life of foodstuffs, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for the purpose are recycled, necessitates quite a high expenditure of energy. In the case of jars, an additional aggravating factor is elevated expenditure on transport. The jars are usually prefabricated in a glass factory and then have to be transported to the facility where the foodstuffs are dispensed with utilization of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a regular occurrence that broken glass gets into the foodstuff in the course of filling or opening of the filled jars, which can lead in the worst case to internal injuries on consumption of the foodstuff. In addition, both cans and jars have to be labelled for identification and promotion of the food or drink product contents. The jars and cans cannot be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, by contrast to film bags, have to be regarded as a further development of the aforementioned jars and cans.

In this context, these laminate containers already have many advantages over the conventional jars and cans. Nevertheless, there are also opportunities for improvement in the case of these packaging systems. As described above in the context of cans and jars, there is a need in the art for foodstuff containers which can be stored as dense and as space-saving as possible. With regard to this need laminate containers in general have considerable advantages over the conventional jars and cans. As this need, however is fundamental in the art, further improvements in this context are highly appreciated. Further, there is a need for foodstuff containers which can be stored over as long as possible storage times.

Producing the laminate containers from the sheetlike composite includes manipulating the sheetlike composite in a multitude of manipulation steps. Surprisingly, it has been found that some combinations of these manipulation steps result in closed containers which are superior in terms of certain technical features. Further, it has been found that these technical advantages correlate with a parameter of the closed container which is herein referred to as shaping coefficient. This shaping coefficient can be measured via the test method described herein. A closed container having a specific shaping coefficient shows surprising technical advantages. Hence, to the knowledge of the inventors the shaping coefficient is the only means to comprehensively characterise the aforementioned advantageous laminate containers. As described above, it is in particular not sufficient to describe the containers by way of the materials or layers of the sheetlike composite in order to define the advantageous containers according to the invention. Further, the advantageous containers may be obtained by various different combinations of manipulation steps which may all result in a specific shaping coefficient.

In general terms, it is an object of the present invention to at least partly overcome a drawback which arises from the prior art. Further, it is an object of the invention to at least partly fulfil a need which is existent in the technical field of dimensionally stable foodstuff containers. It is a further object of the invention to provide a dimensionally stable foodstuff container, wherein a multitude of such containers can be stored as dense and space-saving as possible with minimum impairment of the containers, in particular with regard to their shape or integrity or both. Additionally or alternatively, it is an object of the invention to provide a dimensionally stable foodstuff container, which is suitable for storing a foodstuff over an as long as possible storage time with minimum impairment of the foodstuff, in particular with regard to a vitamin C content of the foodstuff or its taste or both.

It is a further object of the invention to provide a dimensionally stable foodstuff container, which can be produced from a container precursor in a filling machine with fewer faults in production. It is a further object of the invention to provide a dimensionally stable foodstuff container, which can be produced from a container precursor in a filling machine with reduced downtime of the filling machine. It is a further object of the invention to provide a dimensionally stable foodstuff container, which can be produced from a container precursor with increased productivity of a container production method. It is a further object of the invention to provide a dimensionally stable foodstuff container, which can be produced from a container to precursor in a filling machine with reduced risk of an outer face of the container, in particular a decoration, being damaged in the course of the production method. It is a further object of the invention to reduce production faults and stoppages in the production of dimensionally stable foodstuff containers. Further, it is an object of the invention to provide a filling machine which is suitable for producing a foodstuff container having at least one of the aforementioned advantageous.

A contribution to the at least partial achievement of at least one of the aforementioned objects is made by the independent claims. The dependent claims provide preferred embodiments which contribute to the at least partial achievement of at least one of the objects.

In the present description, specified ranges also include the values mentioned as limits. A statement of the kind "in the range from X to Y" or also "within the range from X to Y" in relation to a parameter A consequently means that A can assume the values of X, Y and values between X and Y. Ranges limited at one end of the kind "up to Y" for a parameter A correspondingly mean, as values, Y and less than Y.

A contribution to the achievement of at least one of the objects of the invention is made by an embodiment 1 of a closed container 1, delimiting an interior from an exterior, wherein the closed container comprises a sheetlike composite; wherein the sheetlike composite comprises a layer sequence, comprising as mutually superposed layers in a direction from an inner face of the sheetlike composite to an outer face of the sheetlike composite a) an inner polymer layer,
b) a barrier layer, and
c) a carrier layer;

wherein the closed container is characterised by a shaping coefficient, determined according to the method described herein, in the range from 1.0 to 10.0 m$^2$/kg, preferably from 1.5 to 9.0 m$^2$/kg, more preferably from 1.5 to 8.0 m$^2$/kg, more preferably from 1.7 to 7.5 m$^2$/kg, more preferably from 1.9 to 7.0 m$^2$/kg, more preferably from 2.1 to 6.5 m$^2$/kg, more preferably from 2.3 to 6.2 m$^2$/kg, most preferably from 2.4 to 6.0 m$^2$/kg. Preferably, the closed container is a foodstuff container.

In an embodiment 2 according to the invention, the closed container 1 is configured according to its embodiment 1, wherein the closed container further comprises a. a base region;
b. a top region; and
c. at least four longitudinal folds, each extending from the base region to the top region.

Preferably, the closed container comprises exactly four longitudinal folds, which each extend from the base region to the top region. Preferably, the sheetlike composite at least partly, more preferably fully, forms the base region or the top region or both. Additionally or alternatively, the sheetlike composite preferably comprises the at least four longitudinal folds. Preferably, the top region of the closed container is formed by regions of the sheetlike composite which form a surface or surfaces of the closed container which delimits the closed container upwardly, when the closed container is standing upright. Hence, the top region of the closed container is preferably a roof of the closed container. Further preferably, the base region of the closed container is formed by regions of the sheetlike composite which form a base of the closed container. Therein, a base is a surface or surfaces of the closed container which is in contact with the ground when the closed container is standing upright.

In an embodiment 3 according to the invention, the closed container 1 is configured according to its embodiment 1 or 2, wherein the at least four longitudinal folds are each formed along a longitudinal groove.

In an embodiment 4 according to the invention, the closed container 1 is configured according to any of its preceding embodiments, wherein the sheetlike composite comprises a first longitudinal edge and a further longitudinal edge, wherein the first longitudinal edge is bonded, preferably sealed, to the further longitudinal edge forming a longitudinal seam of the closed container.

In an embodiment 5 according to the invention, the closed container 1 is configured according to any of its embodiments 2 to 4, wherein each of the at least four longitudinal folds is characterised by an internal angle in the range from 70 to 110°, preferably from 75 to 105°, more preferably from 80 to 100°, most preferably from 85 to 95°. Preferably, the closed container has a rectangular transversal cross section.

In an embodiment 6 according to the invention, the closed container 1 is configured according to any of its preceding embodiments, wherein the interior comprises a foodstuff.

In an embodiment 7 according to the invention, the closed container 1 is configured according to any of its preceding embodiments, wherein on a side facing away from the barrier layer the carrier layer is superimposed by a colour application, preferably a decoration. The colour application preferably comprises at least one, preferably at least 2, more preferably at least 3, more preferably at least 4, more preferably at least 5, most preferably at least 6, colourants. Therein, each colourant has preferably a different colour.

In an embodiment 8 according to the invention, the closed container 1 is configured according to its embodiment 7, wherein the colour application adjoins the carrier layer.

In an embodiment 9 according to the invention, the closed container 1 is configured according to its embodiment 7 or 8, wherein the colour application comprises a 2D-code.

In an embodiment 10 according to the invention, the closed container 1 is configured according to its embodiment 9, wherein the 2D-code comprises a graphic representation of a sequence of bits.

In an embodiment 11 according to the invention, the closed container 1 is configured according to any of its embodiments 2 to 10, wherein the carrier layer of the sheetlike composite comprises an oriented material, wherein the oriented material is characterized by a direction of orientation, wherein the direction of orientation forms an angle of orientation at least with a section of at least one, preferably of at least 2, more preferably of at least 3, more preferably of at least 4, most preferably of all, of the at least four longitudinal folds, wherein the angle of orientation is in a range from 60 to 120°, preferably from 70 to 110°, more preferably from 75 to 105°, more preferably from 80 to 100°, most preferably from 85 to 95°. Preferably, the direction of orientation forms the aforementioned angle with the at least one, preferably at least 2, more preferably at least 3, more preferably at least 4, most preferably all, of the at least four longitudinal folds over at least 80%, preferably at least 90%, most preferably at least 95%, of a length of each of the aforementioned longitudinal folds.

In an embodiment 12 according to the invention, the closed container 1 is configured according to any of its embodiments 2 to 10, wherein the carrier layer of the sheetlike composite comprises an oriented material, wherein the oriented material is characterized by a direction of orientation, wherein the direction of orientation forms an angle of orientation at least with a section of at least one, preferably of at least 2, more preferably of at least 3, more preferably of at least 4, most preferably of all, of the at least four longitudinal folds, wherein the angle of orientation is in a range from 0 to 30°, preferably from 0 to 20°, more preferably from 0 to 10°, most preferably from 0 to 5°. Preferably, the direction of orientation forms the aforementioned angle with the at least one, preferably at least 2, more preferably at least 3, more preferably at least 4, most preferably all, of the at least four longitudinal folds over at least 80%, preferably at least 90%, most preferably at least 95%, of a length of each of the aforementioned longitudinal folds.

In an embodiment 13 according to the invention, the closed container 1 is configured according to any of its embodiments 3 to 12, wherein the longitudinal grooves each comprise a recess on the outer face of the sheetlike composite and a bulge on the inner face of the sheetlike composite. The longitudinal grooves have preferably been produced by the action of a creasing tool.

In an embodiment 14 according to the invention, the closed container 1 is configured according to any of its embodiments 2 to 13, wherein the carrier layer is split at least partly into at least 2 separate sublayers along at least 2, preferably at least 3, more preferably at least 4, selected from the at least four longitudinal folds. Preferably, the carrier layer is split at least partly into at least 2 separate sublayers along each of the at least four longitudinal folds.

In an embodiment 15 according to the invention, the closed container 1 is configured according to any of its embodiments 2 to 14, wherein the carrier layer forms a cavity along each of at least 2, preferably at least 3, more preferably at least 4, selected from the at least four longitudinal folds. Preferably, the carrier layer forms a cavity along each of the at least four longitudinal folds.

In an embodiment 16 according to the invention, the closed container 1 is configured according to any of its preceding embodiments, wherein the carrier layer is superimposed by an outer polymer layer on a side of the carrier layer facing away from the barrier layer. Further preferably, the outer polymer layer is superimposed by a colour application, preferably a decoration, on a side of the outer polymer layer facing away from the carrier layer. The colour application preferably comprises at least one, preferably at least 2, more preferably at least 3, more preferably at least 4, more preferably at least 5, most preferably at least 6, colourants. Therein, each colourant has preferably a different colour.

In an embodiment 17 according to the invention, the closed container 1 is configured according to any of its preceding embodiments, wherein the barrier layer comprises, preferably consists of, one selected from the group consisting of a plastic, a metal and a metal oxide, or a combination of at least two thereof.

In an embodiment 18 according to the invention, the closed container 1 is configured according to any of its preceding embodiments, wherein the inner polymer layer comprises a polymer prepared by means of a metallocene catalyst to an extent of 10 to 90% by weight, preferably to an extent of 25 to 90% by weight, more preferably to an extent of 30 to 80% by weight, based in each case on the total weight of the inner polymer layer.

In an embodiment 19 according to the invention, the closed container 1 is configured according to any of its embodiments 1 to 17, wherein the inner polymer layer comprises a polymer blend, wherein the polymer blend comprises an mPE to an extent of 10 to 90% by weight, preferably to an extent of 25 to 90% by weight, more preferably to an extent of 30 to 80% by weight, and a further polymer to an extent of at least 10% by weight, preferably to an extent of at least 15% by weight, more preferably to an extent of at least 20% by weight, based in each case on the total weight of the polymer blend.

In an embodiment 20 according to the invention, the closed container 1 is configured according to any of its preceding embodiments, wherein the carrier layer comprises, preferably consists of, one selected from the group consisting of cardboard, paperboard and paper, or a combination of at least two thereof.

In an embodiment 21 according to the invention, the closed container 1 is configured according to any of its preceding embodiments, wherein the carrier layer has at least one hole, wherein the hole is covered at least by the barrier layer and at least by the inner polymer layer as hole-covering layers.

A contribution to the achievement of at least one of the objects of the invention is made by an embodiment 1 of a method, comprising as method steps
 a) providing a container precursor, comprising a sheetlike composite, comprising a layer sequence, comprising as mutually superposed layers in a direction from an inner face of the sheetlike composite to an outer face of the sheetlike composite
  i) an inner polymer layer,
  ii) a barrier layer, and
  iii) a carrier layer;
 b) filling the container precursor with a foodstuff; and
 c) closing the container precursor, thereby obtaining a closed container;
wherein the closed container is characterised by a shaping coefficient, determined according to the method described herein, in the range from 1.0 to 10.0 m$^2$/kg, preferably from 1.5 to 9.0 m$^2$/kg, more preferably from 1.5 to 8.0 m$^2$/kg, more preferably from 1.7 to 7.5 m$^2$/kg, more preferably from 1.9 to 7.0 m$^2$/kg, more preferably from 2.1 to 6.5 m$^2$/kg, more preferably from 2.3 to 6.2 m$^2$/kg, most preferably from 2.4 to 6.0 m$^2$/kg.

In the method step a), the container precursor is preferably folded flat, the container precursor preferably having a thickness of less than 10 mm, more preferably less than 8 mm, more preferably less than 5 mm, most preferably less than 4 mm. Further preferably, the container precursor is in a one-piece form. The closing in method step c) is preferably effected by folding the sheetlike composite and bonding of regions of the sheetlike composite to each other.

In an embodiment 2 according to the invention, the method is configured according to its embodiment 1, wherein in the method step a) the container precursor comprises at least two longitudinal folds, preferably at least 4 longitudinal folds. In an embodiment of the invention the container precursor comprises in the method step a) exactly 2 or exactly 4 longitudinal folds.

In an embodiment 3 according to the invention, the method is configured according to its embodiment 1 or 2, wherein in the method step a) the sheetlike composite further comprises a first longitudinal edge and a further longitudinal edge, wherein the first longitudinal edge is bonded to the further longitudinal edge forming a longitudinal seam of the container precursor.

In an embodiment 4 according to the invention, the method is configured according to any of its embodiments 1 to 3, wherein the method further comprises a shaping of a base region of the container precursor and closing the container precursor in the base region. The shaping of the base region is preferably effected by folding the sheetlike composite, preferably along grooves in the sheetlike composite which define the base region. Preferably, the method comprises the shaping and closing of the base region between the method steps a) and b). In this context, the closing in step c) is preferably a closing of the container precursor in a top region. Here, the method preferably comprises between the steps b) and c) a shaping of a top region of the container precursor, preferably by folding the sheetlike composite, preferably along grooves in the sheetlike composite which define the top region. Preferably, the closed container is obtained by closing the container precursor in the top region.

In another preferred embodiment of the invention, the method the container precursor is closed in the base region after method step c). Here, preferably the base region is shaped, preferably by folding the sheetlike composite, preferably along grooves in the sheetlike composite which define the base region, after the closing of the container precursor in the base region. According to this embodiment it is further preferred for a top region to be closed and shaped, preferably by folding the sheetlike composite, preferably along grooves in the sheetlike composite which define the top region. In this embodiment, the shaping of the top region is preferably performed after the closing of the container precursor in the top region. Preferably, the closed container is obtained by closing the container precursor in the top region.

Closing the container precursor in the top or base region or both is preferably effected by bonding of regions of the sheetlike composite to each other.

In an embodiment 5 according to the invention, the method is configured according to any of its embodiments 2 to 4, wherein the at least two longitudinal folds are each formed along a longitudinal groove.

In an embodiment 6 according to the invention, the method is configured according to any of its embodiments 2 to 5, wherein in the method step a) at least two of the at least two longitudinal folds are each characterised by an internal angle in the range from 0 to 20°, preferably from 0 to 15°, more preferably from 0 to 10°, most preferably from 0 to 5°. Particularly preferably exactly two of the at least two longitudinal folds are each characterised by the preceding internal angle in the method step a). In a particularly preferable embodiment the preceding internal angle is 0° in the method step a).

In an embodiment 7 according to the invention, the method is configured according to any of its embodiments 1 to 6, wherein on a side facing away from the barrier layer the carrier layer is superimposed by a colour application, preferably a decoration.

In an embodiment 8 according to the invention, the method is configured according to its embodiment 7, wherein the colour application adjoins the carrier layer.

In an embodiment 9 according to the invention, the method is configured according to its embodiment 7 or 8, wherein the colour application comprises a 2D-code.

In an embodiment 10 according to the invention, the method is configured according to any of its embodiments 1 to 8, wherein after the method step c) the method further comprises superimposing the outer face of the sheetlike composite with a 2D-code.

In an embodiment 11 according to the invention, the method is configured according to its embodiment 9 or 10, wherein the 2D-code comprises a graphic representation of a sequence of bits.

In an embodiment 12 according to the invention, the method is configured according to any of its embodiments 2 to 11, wherein the carrier layer of the sheetlike composite comprises an oriented material, wherein the oriented material is characterized by a direction of orientation, wherein the direction of orientation forms an angle of orientation at least with a section of at least one, preferably of at least 2, most preferably of all, of the at least two longitudinal folds, wherein the angle of orientation is in a range from 60 to 120°, preferably from 70 to 110°, more preferably from 75 to 105°, more preferably from 80 to 100°, most preferably from 85 to 95°. Preferably, the direction of orientation forms the aforementioned angle with the at least one, preferably of at least 2, most preferably of all, of the at least two longitudinal folds over at least 80%, preferably at least 90%, most preferably at least 95%, of a length of each of the aforementioned longitudinal folds.

In an embodiment 13 according to the invention, the method is configured according to any of its embodiments 2 to 11, wherein the carrier layer of the sheetlike composite comprises an oriented material, wherein the oriented material is characterized by a direction of orientation, wherein the direction of orientation forms an angle of orientation at least with a section of at least one, preferably of at least 2, most preferably of all, of the at least two longitudinal folds, wherein the angle of orientation is in a range from 0 to 30°, preferably from 0 to 20°, more preferably from 0 to 10°, most preferably from 0 to 5°. Preferably, the direction of orientation forms the aforementioned angle with the at least one, preferably of at least 2, most preferably of all, of the at least two longitudinal folds over at least 80%, preferably at least 90%, most preferably at least 95%, of a length of each of the aforementioned longitudinal folds.

In an embodiment 14 according to the invention, the method is configured according to any of its embodiments 5 to 13, wherein the longitudinal grooves each comprise a recess on the outer face of the sheetlike composite and a bulge on the inner face of the sheetlike composite.

In an embodiment 15 according to the invention, the method is configured according to any of its embodiments 2 to 14, wherein in the method step a) the carrier layer has been split at least partly into at least 2 separate sublayers along at least two of the longitudinal folds.

In an embodiment 16 according to the invention, the method is configured according to any of its embodiments 2 to 15, wherein the carrier layer forms a cavity along at least two of the longitudinal folds.

In an embodiment 17 according to the invention, the method is configured according to any of its embodiments 1 to 16, wherein the carrier layer is superimposed by an outer polymer layer on a side of the carrier layer facing away from the barrier layer.

In an embodiment 18 according to the invention, the method is configured according to any of its embodiments 1 to 17, wherein the barrier layer comprises, preferably consists of, one selected from the group consisting of a plastic, a metal and a metal oxide, or a combination of at least two thereof.

In an embodiment 19 according to the invention, the method is configured according to any of its embodiments 1 to 18, wherein the inner polymer layer comprises a polymer prepared by means of a metallocene catalyst to an extent of 10 to 90% by weight, preferably to an extent of 25 to 90% by weight, more preferably to an extent of 30 to 80% by weight, based in each case on the total weight of the inner polymer layer.

In an embodiment 20 according to the invention, the method is configured according to any of its embodiments 1 to 18, wherein the inner polymer layer comprises a polymer blend, wherein the polymer blend comprises an mPE to an extent of 10 to 90% by weight, preferably to an extent of 25 to 90% by weight, more preferably to an extent of 30 to 80% by weight, and a further polymer to an extent of at least 10% by weight, preferably to an extent of at least 15% by weight, more preferably to an extent of at least 20% by weight, based in each case on the total weight of the polymer blend.

In an embodiment 21 according to the invention, the method is configured according to any of its embodiments 1 to 20, wherein the carrier layer comprises, preferably consists of, one selected from the group consisting of cardboard, paperboard and paper, or a combination of at least two thereof.

In an embodiment 22 according to the invention, the method is configured according to any of its embodiments 1 to 21, wherein in the method step a) the carrier layer has at least one hole, wherein the hole is covered at least by the barrier layer and at least by the inner polymer layer as hole-covering layers.

In an embodiment 23 according to the invention, the method is configured according to any of its embodiments 1 to 22, wherein the closing in the method step c) comprises a sealing, wherein the sealing is effected by means of one selected from the group consisting of irradiation, contacting with a hot solid, inducement of a mechanical vibration and contacting with a hot gas, or by a combination of at least two of these.

In an embodiment 24 according to the invention, the method is configured according to any of its embodiments 1 to 23, wherein the method further comprises a method step d), wherein the closed container is bonded to an opening aid in the method step d). Preferably, the closed container is bonded to the opening aid in such a way that the opening aid covers a hole in the carrier layer. A preferred opening aid is a cutting tool, for example a cutting ring. Further preferably, the opening aid may include a lid.

A contribution to the achievement of at least one of the objects of the invention is made by an embodiment 1 of a closed container 2, obtainable by the method according to any of its embodiments 1 to 24. Preferably, the closed container does not include any lid or base, or both, that has not been formed in one piece with the sheetlike composite.

A contribution to the achievement of at least one of the objects of the invention is made by an embodiment 1 of an apparatus, designed for producing the closed container 1 or 2, in each case according to any of its embodiments, from a container precursor. A preferred apparatus is a filling machine. Preferably, the apparatus is designed for producing the closed container by means of the method of the invention according to any of its embodiments. A further preferred apparatus comprises a mandrel, preferably designed to accommodate the container precursor, wherein the mandrel is preferably part of a mandrel wheel designed to transport the container precursor.

In an embodiment 2 according to the invention, the apparatus is configured according to its embodiment 1, wherein the container precursor comprises the sheetlike composite, comprising the layer sequence, comprising as mutually superposed layers in the direction from the inner face of the sheetlike composite to the outer face of the sheetlike composite A) the inner polymer layer,
B) the barrier layer, and
C) the carrier layer, wherein the sheetlike composite further comprises a first longitudinal edge and a further longitudinal edge, wherein the first longitudinal edge is bonded to the further longitudinal edge forming a longitudinal seam of the container precursor.

A contribution to the achievement of at least one of the objects of the invention is made by an embodiment 1 of a use 1 of a sheetlike composite for producing the closed container 1 or 2, in each case according to any of its embodiments.

A contribution to the achievement of at least one of the objects of the invention is made by an embodiment 1 of a use 2 of the closed container 1 or 2, in each case according to any of its embodiments, for storing a foodstuff.

Features described as preferred in one category of the invention are likewise preferred in an embodiment of the further categories of the invention.

Oriented Material

A preferred oriented material comprises a multitude of fibres. Preferred fibres are plant fibres. Further, a preferred oriented material is one selected from the group consisting of cardboard, paperboard and paper or a combination of at least two thereof. A preferred direction of orientation is a direction of a majority of fibres of the oriented material. The carrier layer preferably consists of the oriented material.

Layers

Two layers are bonded to each other when their adhesion to each other goes beyond van der Waals attraction forces. Layers that are bonded together are preferably sealed together, or glued together, or pressed together, or bonded through a combination of two or more of these measures. Unless otherwise specified, in a layer sequence the layers may follow each other indirectly, that is to say with one or at least two intermediate layers, or directly, that is to say without an intermediate layer. This is the case, in particular, with formulation, in which a layer superposes or superimposes another layer. A formulation in which a layer sequence comprises enumerated layers means that at least the specified layers are present in the specified sequence. This formulation does not necessarily mean that these layers have to be in immediate succession. A formulation in which two layers adjoin each other means that these two layers are in immediate succession without an intermediate layer. However, this formulation does not indicate whether the two layers are bonded together or not. Rather, these two layers may be in contact with each other.

Bonding

Bonding is preferably selected from the group consisting of sealing, gluing and pressing, or a combination of at least two thereof. In the case of sealing, the bond is created by means of a liquid, preferably a melt, and its solidification which is preferably effected by cooling the melt below its melting temperature. In the case of gluing, chemical bonds form between the interfaces or surfaces of the two objects to be bonded together, which create the bond. Therein, a liquid glue is preferably solidified by chemical reaction or by evaporation of a solvent from the glue or both. In the case of sealing or gluing, it is frequently advantageous to press together the surfaces to be sealed or glued. A preferred form of pressing two layers is to press together a first surface of a first of the two layers onto a second layer facing the first layer of the second of the two layers over at least 20%, preferably at least 30%, more preferably at least 40%, more preferably at least 50%, more preferably at least 60%, more preferably at least 70%, still more preferably at least 80%, still more preferably at least 90%, most preferably at least 95%, of the first surface. Sealing preferably comprises the process steps of heating, laying one on top of the other, and pressing, wherein the process steps preferably follow each other in this sequence. Another sequence is also conceivable, in particular the sequence of laying the layers one on top of the other, heating, and pressing. Preferential heating is heating of a polymer layer, preferably a thermoplastic layer, more preferably a polyethylene layer, or a polypropylene layer, or both. A further preferred form of heating is heating of a polyethylene layer to a temperature of between 80 and 140° C., more preferably between 90 and 130° C., most preferably between 100 and 120° C. A further preferred form of heating is heating of a polypropylene layer to a temperature of between 120 and 200° C., more preferably between 130 and 180° C., most preferably between 140 and 170° C. A further preferred form of heating is carried out to a seal temperature of the polymer layer. A preferred form of heating may be carried out through radiation, through hot gas, through solids heat contact, through mechanical vibrations, or through a combination of at least two of these measures. A particularly preferred form of heating is carried out through the excitation of an ultrasonic vibration.

Polymer Layers

The term "polymer layer" refers hereinafter especially to the inner polymer layer, the outer polymer layer and the intermediate polymer layer. An intermediate polymer layer refers here to a polymer layer between the carrier layer and the barrier layer. The sheetlike composite of the closed container according to the invention preferably comprises an intermediate polymer layer. A preferred polymer is a polyolefin. The polymer layers may have further constituents. The polymer layers are preferably introduced into or applied to the sheetlike composite material in an extrusion method. The further constituents of the polymer layers are preferably constituents that do not adversely affect the behaviour of the polymer melt on application as a layer. The further constituents may, for example, be inorganic compounds, such as metal salts, or further plastics, such as further thermoplastics. However, it is also conceivable that the further constituents are fillers or pigments, for example carbon black or metal oxides. Suitable thermoplastics for the further constituents especially include those that are readily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene), VLDPE (very low density polyethylene) and PE (polyethylene), and mixtures of at least two thereof. It is also possible to use mixtures of at least two thermoplastics. Suitable polymer layers have a melt flow rate (MFR) in a range from 1 to 25 g/10 min, preferably in a range from 2 to 20 g/10 min and more preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and further preferably in a range from 0.900 g/cm$^3$ to 0.970 g/cm$^3$. The polymer layers preferably have at least one melting temperature in a range from 80 to 155° C., preferably in a range from 90 to 145° C. and more preferably in a range from 95 to 135° C.

Inner Polymer Layer

The inner polymer layer is preferably based on thermoplastic polymers, where the inner polymer layer may include a particulate inorganic solid. However, it is preferable that the inner polymer layer comprises a thermoplastic polymer to an extent of at least 70% by weight, preferably at least 80% by weight and more preferably at least 95% by weight, based in each case on the total weight of the inner polymer layer. Preferably, the polymer or polymer mixture of the inner polymer layer has a density (according to ISO 1183-1:2004) in a range from 0.900 to 0.980 g/cm$^3$, more preferably in a range from 0.900 to 0.960 g/cm$^3$ and most preferably in a range from 0.900 to 0.940 g/cm$^3$.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. As well as a number of plastics, preference is given to plant-based fibrous materials, especially pulps, preferably sized, bleached and/or unbleached pulps, paper and paperboard being especially preferred. The grammage of the carrier layer is preferably in a range from 120 to 450 g/m$^2$, especially preferably in a range from 130 to 400 g/m$^2$ and most preferably in a range from 150 to 380 g/m$^2$. A preferred paperboard generally has a single-layer or multilayer structure and may have been coated on one or both sides with one or else more than one cover layer. In addition, a more preferred paperboard has a residual moisture content of less than 20% by weight, preferably of 2 to 15% by weight and especially preferably of 4 to 10% by weight, based on the total weight of the paperboard. A more particularly preferred paperboard has a multilayer structure. Further preferably, the paperboard has, on a surface facing away from the barrier layer, at least one lamina, but more preferably at least two laminas, of a cover layer known to the person skilled in the art as a "paper coating". In addition, a more preferred paperboard has a Scott bond value in a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

The carrier layer has a bending resistance which can be determined according to the standard ISO 2493:2010 using a bending measurement device. As a bending measurement device an L&W Bending Tester—code 160 of Lorentzen & Wettre, Sweden has been applied in making the present invention. The bending resistance is determined by deflecting the sample by 15°. In a first direction, the carrier layer preferably has a bending resistance in the range from 80 to 550 mN. In the case of a carrier layer having a plurality of fibres, the first direction is preferably a direction of orientation of the fibres. In the field of paper and cardboard making, this direction of orientation of fibres is also known as running direction. In a second direction which is perpendicular to the first direction, a carrier layer having a plurality of fibres further preferably has a bending resistance in the range from 20 to 300 mN. Samples used to determine the preceding bending resistances with the bending measurement device mentioned above have a width of 38 mm and a clamping length of 50 mm. A preferred sheetlike composite having the carrier layer is characterised by a bending resistance in the first direction in the range from 100 to 700 mN. Further preferably, this sheetlike composite has a bending resistance in the second direction in the range from 50 to 500 mN. Therein, the bending resistance measurements of the sheetlike composite have been performed using the same measuring device as mentioned above for the carrier layer.

Furthermore, measurement samples of the sheetlike composite also had a width of 38 mm and a clamping length of 50 mm. A material having the differing bending resistances in the first and the second direction is also referred to as oriented material herein. Therein, the direction of orientation is preferably the first direction.

Cover Layer

A preferred cover layer is a "paper coating". In paper manufacturing, a "paper coating" is a cover layer which comprises inorganic solid particles, preferably pigments and additives. The "paper coating" is preferably applied as a liquid phase, preferably as a suspension or a dispersion, to a surface of a layer containing paper or cardboard. A preferred dispersion is an aqueous dispersion. A preferred suspension is an aqueous suspension. A further preferred liquid phase comprises inorganic solid particles, preferably pigments, a binder, and an additive. A preferred pigment is one selected from the group consisting of calcium carbonate, kaolin, talc, silicate, a plastic pigment, and titanium oxide. A preferred kaolin is calcinated kaolin. A preferred calcium carbonate is one selected from a group consisting of marble, chalk and a precipitated calcium carbonate (PCC) or a combination of at least two thereof. A preferred silicate is a layer silicate. A preferred plastic pigment is spherical, preferably in the shape of a hollow sphere. A preferred binder is one selected from the group consisting of styrene-butadiene, acrylate, acrylonitrile, starch and polyvinyl alcohol or a combination of at least two thereof, wherein acrylate is preferred. A preferred starch is one selected from the group consisting of cationically modified, anionically modified, and fragmented, or a combination of at least two thereof. A preferred additive is one selected from the group consisting of a rheology modifier, a shading dye, an optical brightener, a carrier for an optical brightener, a flocculent, a deaerating agent, and a surface energy modifier, or a combination of at least two thereof. A preferred deaerating agent is a coating colour deaerating agent, preferably based on silicone or on fatty acids, or both. A preferred surface energy modifier is a surfactant.

Barrier Layer

The barrier layer used may be any material which is suitable for a person skilled in the art for this purpose and which has sufficient barrier action, especially with respect to oxygen, preferably in addition with respect to moisture. The barrier layer is preferably selected from
  a. a plastic barrier layer;
  b. a metal layer;
  c. a metal oxide layer; or
  d. a combination of at least two of a. to c.

If the barrier layer, according to alternative a., is a plastic r barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastic, especially thermoplastics, here include N- or O-bearing plastic, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the plastic barrier layer has a grammage in a range from 2 to 120 g/m$^2$, preferably in a range from 3 to 60 g/m$^2$, especially preferably in a range from 4 to 40 g/m$^2$ and further preferably from 6 to 30 g/m$^2$. Further preferably, the plastic barrier layer is obtainable from melts, for example by extrusion, especially laminar extrusion. Further preferably, the plastic barrier layer may also be introduced into the sheetlike composite via lamination. It is preferable in this context that a film is incorporated into the sheetlike composite. In another embodiment, it is also possible to select plastic barrier layers obtainable by deposition from a solution or dispersion of plastic s.

Suitable polymers preferably include those having a weight-average molecular weight, determined by gel permeation chromatography (GPC) by means of light scattering, in a range from $3 \cdot 10^3$ to $1 \cdot 10^7$ g/mol, preferably in a range from $5 \cdot 10^3$ to $1 \cdot 10^6$ g/mol and especially preferably in a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm$^3$, preferably in a range from 1.05 to 1.30 g/cm$^3$ and especially preferably in a range from 1.08 to 1.25 g/cm$^3$. It is further preferable that the PA has a viscosity number in a range from 130 to 250 ml/g and preferably in a range from 140 to 220 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all of the following properties:
  an ethylene content in a range from 20 to 60 mol %, preferably from 25 to 45 mol %;
  a density in a range from 1.0 to 1.4 g/cm$^3$, preferably from 1.1 to 1.3 g/cm$^3$;
  a melting point in a range from more than 155 to 235° C., preferably from 165 to 225° C.;
  an MFR value (210° C./2.16 kg when $T_{S(EVOH)}<230°$ C.; 230° C./2.16 kg when 210° C.$<T_{S(EVOH)}<230°$ C.) in a range from 1 to 25 g/10 min, preferably from 2 to 20 g/10 min;
  an oxygen permeation rate in a range from 0.05 to 3.2 cm$^3 \cdot 20$ μm/(m$^2 \cdot$day$\cdot$atm), preferably in a range from 0.1 to 1 cm$^3 \cdot 20$ μm/(m$^2 \cdot$day$\cdot$atm).

Preferably at least one polymer layer, further preferably the inner polymer layer, or preferably all polymer layers, have a melting temperature below the melting temperature of the barrier layer. This is especially true when the barrier layer is formed from polymer. In this case, the melting temperatures of the at least one polymer layer, especially the inner polymer layer, and the melting temperature of the barrier layer differ preferably by at least 1 K, especially preferably by at least 10 K, even more preferably by at least 50 K, further preferably at least 100 K. The temperature difference should preferably be chosen only such that it is sufficiently high that there is no melting of the barrier layer, especially no melting of the plastic barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 μm, preferably in a range from 3.5 to 12 μm and especially preferably in a range from 4 to 10 μm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a preferred configuration, the metal layer consists of an aluminium foil. Suitable aluminium foils have a ductility of more than 1%, preferably of more than 1.3% and especially preferably of more than 1.5%, and a tensile strength of more than 30 N/mm², preferably more than 40 N/mm² and especially preferably more than 50 N/mm². Suitable aluminium foils in the pipette test show a droplet size of more than 3 mm, preferably more than 4 mm and especially preferably of more than 5 mm. Suitable alloys for creation of aluminium layers or foils are commercially available under the EN AW 1200, EN AW 8079 or EN AW 8111 names from Hydro Aluminium Deutschland GmbH or Amcor Flexibles Singen GmbH. In the case of a metal foil as barrier layer, it is possible to provide an adhesion promoter layer between the metal foil and a closest polymer layer on one or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred method for this purpose is physical gas phase deposition.

In a further preferred embodiment, the metal layer may take the form of a layer composite composed of one or more polymer layers with a metal layer. Such a layer is obtainable, for example, by vapour deposition of metal on a polymer layer, for example an oriented polypropylene film. A preferred method for this purpose is physical gas phase deposition.

Outer Face

The outer face of the sheetlike composite is a surface of a ply of the sheetlike composite which is intended to be in contact with the environment of the closed container. This does not oppose that in individual regions of the container, outer faces of various regions of the composite are folded onto one another or bonded to one another, for example sealed to one another. In the closed container the inner face of the sheetlike composite predominantly faces the interior and the outer face predominantly faces the exterior.

Inner Face

The inner face of the sheetlike composite is a surface of a ply of the sheetlike composite which is intended to be in contact with the contents of the closed container, preferably a foodstuff.

Adhesion/Adhesion Promoter Layer

An adhesion promoter layer may be present between layers which do not directly adjoin one another, preferably between the barrier layer and the inner polymer layer. Useful adhesion promoters in an adhesion promoter layer include all polymers which are suitable for producing a firm bond through functionalization by means of suitable functional groups, through the forming of ionic bonds or covalent bonds with a surface of a respective adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel® 0609HSA trade names by DuPont or Escor®6000ExCo by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a paperboard fibre tear in the case of a paperboard as carrier layer.

Polyolefin

A preferred polyolefin is a polyethylene (PE) or a polypropylene (PP) or both. A preferred polyethylene is one selected from the group consisting of an LDPE, an LLDPE, and an HDPE, or a combination of at least two thereof. A further preferred polyolefin is an mPolyolefin (polyolefin prepared by means of a metallocene catalyst). Suitable polyethylenes have a melt flow rate (MFR=MFI=melt flow index) in a range from 1 to 25 g/10 min, preferably in a range from 2 to 20 g/10 min and especially preferably in a range from 2.5 to 15 g/10 min, and a density in a range from 0.910 g/cm³ to 0.935 g/cm³, preferably in a range from 0.912 g/cm³ to 0.932 g/cm³, and further preferably in a range from 0.915 g/cm³ to 0.930 g/cm³.

mPolymer

An mPolymer is a polymer which has been prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Melting Points

A preferred mPolyolefin is characterised by at least one first melting point and one second melting point. It is preferable that the mPolyolefin is characterised by a third melting point in addition to the first and the second melting point. A preferred first melting point is in the range from 84 to 108° C., preferably from 89 to 103° C., more preferably from 94 to 98° C. A preferred further melting point is in the range from 100 to 124° C., preferably from 105 to 119° C., more preferably from 110 to 114° C.

Extrusion

In the extrusion, the polymers are typically heated to temperatures of 210 to 350° C., measured in the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is expressed. The opening may have any shape that allows extrusion of the polymer melt to the composite precursor. For example, the opening may be angular, oval or round. The opening is preferably in the form of a slot of a funnel. In a preferred configuration of the method, application is effected through a slot. The slot preferably has a length in a range from 0.1 to 100 m, preferably in a range from 0.5 to 50 m, especially preferably in a range from 1 to 10 m. In addition, the slot preferably has a width in a range from 0.1 to 20 mm, preferably in a range from 0.3 to 10 mm, especially preferably in a range from 0.5 to 5 mm. During the application of the polymer melt, it is preferable that the slot and the composite precursor move relative to one another. Preference is given to such a process wherein the composite precursor moves relative to the slot.

In a preferred extrusion coating method, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched in the preferably monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with an emergence rate $V_{out}$;
b2. application of the melt film to the composite precursor moving relative to the at least one extruder die slot with a movement rate $V_{for}$;

where $V_{out} < V_{for}$. It is especially preferable that $V_{for}$ is greater than $V_{out}$ by a factor in the range from 5 to 200, especially preferably in a range from 7 to 150, further preferably in a range from 10 to 50 and most preferably in a range from 15 to 35. It is preferable here that $V_{for}$ is at least 100 m/min, especially preferably at least 200 m/min and most preferably at least 350 m/min, but typically not more than 1300 m/min. Once the melt layer has been applied to the composite precursor by means of the above-described stretching process, the melt layer is left to cool down for the purpose of heat-setting, this cooling preferably being effected by quenching via contact with a surface which is kept at a temperature in a range from 5 to 50° C., especially preferably in a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the area. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Folding the Sheetlike Composite

The sheet-like composite is preferably folded in a temperature range from 10 to 50° C., preferably in a range from 15 to 45° C., and more preferably in a range from 20 to 40° C. This can be achieved if the sheetlike composite has a temperature in the aforementioned ranges. Further, a folding tool, preferably together with sheetlike composite, preferably has a temperature in the aforementioned ranges. For this, the folding tool preferably does not have a heater. Rather, the folding tool, or the sheetlike composite, or both, can be cooled. Further, it is preferred that folding is carried out at a temperature of no more than 50° C. as cold-folding and that sealing is carried out at a temperature of over 50° C., preferably over 80° C. and more preferably over 120° C. as heat-sealing. The foregoing conditions, in particular the temperatures, also preferably apply in the vicinity of the folding, for example, in the housing of the folding tool. Further, the cold-folding, or the cold-folding in combination with the heat-sealing, is preferably applied at fold-forming angles $\mu$ less than 100°, preferably less than 90°, more preferably less than 70° and most preferably less than 50°. The angle $\mu$ is formed between two adjoining fold surfaces.

Folding according to the invention is understood to mean a process in which an elongated, angle-forming crease is generated in the sheetlike composite, preferably by means of a folding edge of a folding tool. For this, frequently two adjoining surfaces of a sheetlike composite must be increasingly bent towards one another. The folding gives rise to at least two adjoining folding surfaces, which can then be bonded to one another. According to the invention, the bond can be made using any measure that appears suitable to the person skilled in the art which enables an as gas-tight and water-tight connection as possible to be formed.

Further, the fold surfaces preferably form an angle $\mu$ of less than 90°, preferably less than 45° and more preferably less than 20°. Frequently, the fold surfaces are folded to the extent that they come to lie on top of each other at the end of the fold. This is particularly advantageous, if the overlaying folds are then bonded together to form the base of the container and the top of the container, which is often structured in the form of a gable or flat. Regarding the gable arrangement, reference is made to WO 90/09926 A2 by way of example.

Foodstuff

A preferred closed container of the invention includes a foodstuff. Materials that can be regarded as foodstuff are any of the solid or liquid foodstuffs known to the person skilled in the art for human consumption, and also those for consumption by animals. Preferred foodstuffs are liquid above 5° C., examples being dairy products, soups, sauces, and non-carbonated drinks. There are various methods for filling the container or the container precursor. A first possibility is that the foodstuff and the container or the container precursor are separately, before the filling process, sterilised to the greatest possible extent via suitable measures such as treatment of the container or of the container precursor with $H_2O_2$, UV radiation or other suitable high-energy radiation, plasma or a combination of at least two thereof, and also heating of the food, and that the container or the container precursor is then filled. This filling method is often termed "aseptic filling", and is preferred according to the invention. In another method that is widely used, in addition to or else instead of aseptic filling, the container or container precursor filled with foodstuff is heated to reduce the number of germs. This is preferably achieved via pasteurisation or autoclaving. In this procedure it is also possible to use less sterile foodstuffs and containers or container precursors.

Sterilisation

Sterilisation describes the treatment of a product, preferably a container, or a food, or both, in order to reduce the number of bacteria on or in the product. Sterilisation may, for example, take place through the application of heat or through contact with a chemical. The chemical can be gaseous, or liquid, or both. A preferred chemical is hydrogen peroxide.

Autoclaving

Autoclaving describes the treatment of a product, usually a filled and closed container, wherein the product is in a pressure chamber and is heated to a temperature of more than 100° C., preferably between 100 and 140° C. In addition, the chamber pressure in the pressure chamber is above 1 bar, preferably above 1.1 bar, more preferably above 1.2 bar, more preferably above 1.3 bar, and up to 4 bar. Further, autoclaving is preferably carried out with the product in contact with water vapour.

Pasteurisation

Pasteurisation describes the rapid heating of liquid or pasty foodstuffs to temperatures of up to 100° C. to kill, or inhibit the growth of, micro-organisms. It is used to increase the shelf-life of, inter alia, milk, fruit and vegetable juice, and liquid ice.

Container Precursor

A preferred container precursor is shell-shaped or tubular, or both. A shell-shaped container precursor is preferably characterised in that its outer surface corresponds to a geometrical shell surface. A tubular container precursor is preferably a semi-endless tube structure with an opening on opposite ends of the tube.

Container

The closed container according to the invention may have a multitude of different forms, but preference is given to an essentially cuboidal structure. In addition, the full wall area of the container may be formed from the sheetlike composite, or it may have a two-part or multipart construction. In the case of a multipart construction, it is conceivable that, as well as the sheetlike composite, other materials are also used, for example plastic, which can be used particularly in the top or base regions of the container. In this context, however, it is preferable that the container is formed from the sheetlike composite to an extent of at least 50%, especially preferably to an extent of at least 70% and further preferably to an extent of at least 90% of the wall area. In addition, the container may have a device for emptying the contents. This may be formed, for example, from a polymer or mixture of polymers and be mounted on the outside of the container. It is also conceivable that this device has been integrated into the container by direct injection moulding. In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include longitudinal contact regions between two wall surfaces of the container in each case, also referred to as longitudinal edges herein. In the container, the container walls are preferably the surfaces of the container framed by the edges. Preferably, the interior of a container according to the invention comprises a foodstuff. Preferably, the closed container does not comprise any lid or base, or either, that has not been formed in one piece with the sheetlike composite. A preferred closed container comprises a foodstuff.

Longitudinal Seam

Preferably, the closed container according to the invention comprises a first longitudinal edge and a further longitudinal edge. These are edges of the sheetlike composite which preferably extend over a full length of the sheetlike composite. The longitudinal seam is preferably a region of the container precursor or the closed container in which the first and the further longitudinal edge are bonded to one another. Therein, the first and the further longitudinal edge are preferably positioned at opposite side of the sheetlike composite across a plane over which the sheetlike composite extends in a sheetlike manner.

Hole/Opening Aid

To facilitate the opening of the closed container of the invention, the carrier layer may comprise at least one hole. In a special embodiment, the hole is superimposed by at least the barrier layer and the inner polymer layer, preferably also the outer polymer layer, as hole-cover layers. Further, one or several further layers, in particular adhesion promoting layers, can be provided between the abovementioned layers. In this case, the hole-cover layers are preferably connected together at least partially, preferably for at least 30%, preferably for at least 70%, and more preferably for at least 90% of the surface formed by the hole. According to a special embodiment, it is preferred that the hole penetrates the entire wall and is covered by the closing device closing the hole or the opening device. In connection with a preferred embodiment, the hole provided in the carrier layer may have any form known to the person skilled in the art and one that is suitable for various closures, drinking straws or opening aids. Usually, a closed container is opened by means of the, at least partial, destruction of the hole-cover layers covering the hole. This destruction may take place through cutting, pressing into the container, or pulling out of the container. The destruction may take place by means of an openable closing device or a drinking straw connected to the container and arranged in the area of the hole, usually above the hole.

According to a further preferred embodiment, the carrier layer comprises a plurality of holes in the form of a perforation, the individual holes being covered at least by the barrier layer and the inner polymer layer, preferably also the outer polymer layer, as hole-cover layers. A container manufactured from such a composite can then be opened by tearing along the perforations. Such holes for perforations are preferably created by means of a laser. The use of laser beams is particularly preferred if a metal foil or a metalised foil is used as a barrier layer. Further, it is possible for the perforation to be created by mechanical perforation tools, usually having blades.

2D-Code

The 2D-code according to the invention may be any 2D-code which the skilled person may consider appropriate in the context of the invention. Preferably, the 2D-code comprises a plurality of graphic elements and a plurality of gaps between these graphic elements. Preferred graphic elements are lines, preferably straight lines; rectangles, preferably squares; circles; and dots; and combinations of these. Further preferably, data may be encoded into the 2D-code along two axes of a 3-dimensional system of coordinates, hence in 2 dimensions which span an a plane. These two axes of the system of coordinates are also referred to as 2 dimensions. In this context the 2D-code is preferably a 2-dimensional reproduction of data in form of the graphic elements, wherein these graphic elements are arranged in a predetermined 2-dimensional area, thereby encoding the data in 2 dimensions. Therein, pieces of information which are stored in the 2 dimensions are preferably independent from each other. In this context preferred systems of coordinates are a Cartesian system of coordinates and a polar system of coordinates. A preferred 2D-code is machine-readable, wherein preferably the 2D-code is readable by an optoelectronic sensor. Preferably, the 2D-code is readable by a 2D-code reader. Therein, the 2D-code reader may be a device, having an optoelectronic sensor; or a scanner software; or both. A preferred optoelectronic sensor is a laser scanner or a CCD-camera, for example of a smartphone.

A preferred 2D-code is one selected from the group consisting of a matrix code, a 2D-barcode and a dot-code or a combination of at least two thereof. Therein, a matrix code is particularly preferred. A preferred 2D-barcode comprises a plurality of stacked 1D-barcodes. Further preferred 2D-barcodes are Codablock, Code 49, Code 16k and PDF417. Preferred matrix codes are Aztec code, Code 1, ColorCode, Color Construct Code, CrontoSign, CyberCode, Data Matrix, DataGlyphs, Datastrip Code, EZcode, High Capacity Color Barcode, Hax Xin Barcode, HieCode, InterCode, MaxiCode, NexCode, Qode, QR code, ShotCode, SPARQCode, VOICEYE, wherein QR code and SPARQCode are preferred, wherein QR code is particularly preferred. Preferred dot-codes are Dot Code A, Snowflake ode and BeeTagg. A further preferred 2D-code has an area of not more than 40 cm², preferably not more than 30 cm², more preferably not more than 25 cm², even more preferably not more than 20 cm², more preferably not more than 15 cm², more preferably not more than 10 cm², still more preferably not more than 8 cm², most preferably not more than 5 cm².

Colour Application

Generally, a colour application is a solid material on a surface, wherein the solid material comprises at least one colourant. According to DIN 55943:2001-10, colourant is the collective term for all colouring substances, especially for dyes and pigments. A preferred colourant is a pigment. A preferred pigment is an inorganic pigment or an organic pigment or both, wherein the organic pigment is particularly preferred. Pigments that are notable in connection with the invention are especially the pigments mentioned in DIN 55943:2001-10 and those mentioned in "Industrial Organic Pigments, Third Edition" (Willy Herbst, Klaus Hunger Copyright© 2004 WILEY-VCH Verlag GmbH & Co. KGaA, Weinheim ISBN: 3-527-30576-9). However, other pigments may be considered as well. For example, the following are further notable suitable pigments:

i. red or magenta pigments: pigment red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, pigment violet 3, 19, 23, 29, 30, 37, 50 and 88;

ii. blue or cyan pigments: pigment blue 1, 15, 15:1, 15:2, 15:3, 15:4, 15:6, 16, 17-1, 22, 27, 28, 29, 36 and 60;

iii. green pigments: pigment green 7, 26, 36 and 50;

iv. yellow pigments: pigment yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185 and 193 and v. white pigments: pigment white 6, 18 and 21.

Test Methods

The test methods which follow were utilized in the context of the invention. Unless stated otherwise, the measurements were conducted at an ambient temperature of 23° C., an ambient air pressure of 100 kPa (0.986 atm) and a relative air humidity of 50%.

MFR

MFR is measured in accordance with standard ISO 1133 (unless stated otherwise at 190° C. and 2.16 kg).

Density

Density is measured in accordance with standard ISO 1183-1.

Melting Temperature

Melting temperature is determined using the DSC method ISO 11357-1, -5. The instrument is calibrated according to manufacturer's instructions using the following measurements:

temperature indium—onset temperature, melting heat indium, temperature zinc—onset temperature.

Moisture Content of Cardboard

Moisture content of cardboard is measured in accordance with standard ISO 287:2009.

Adhesion

The adhesion of two adjacent layers is determined by fixing them in a 90° peel test instrument, for example of the firm Instron "German rotating wheel fixture", on a rotatable roller which rotates at 40 mm/min during the measurement. The samples were previously cut into strips of width 15 mm. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Shaping Coefficient

Preparation of the Container:

In all the preparation steps presented below, care has to be taken not to manipulate the folds, in particular the longitudinal folds, of the container between its top and base regions, i.e. in the container's lateral shell region.

If the container to be studied is equipped with an opening means in its top region, the container is opened and the content is poured out by tilting the container. The container is not squeezed in order to facilitate emptying. If the container does not have an opening means in its top region or it is otherwise not possible to pour out the contents of the container without further manipulating the container, the container is opened at a later stage of the preparation as described below. In the following, all seams of the container in the top region, except for the longitudinal seam, are opened by carefully and manually tearing plies of the laminate, which are bonded to each other to form the respective seam, apart. If the container has fold protrusions which are also called "ears", they are detached from the container body first. In the course of opening all seams in the top region, also the head seam, which closes the container in its top region, is opened by carefully tearing apart the respective plies of the laminate. If emptying out the contents of the container by pouring has not been possible above, the contents are poured out of the opened container at this stage of the preparations.

Next, the seams of the container in its base region are opened by carefully and manually tearing apart plies of the laminate which form the respective seam. Again the longitudinal seam of the container is not opened. As in the top region, if so container has so called "ears" in its base region, they are manually detached from the container body first. The base seam, which closes the container in its base region is opened as well by detaching the respective plies of the laminate from each other by manually tearing. Hence, a container which is opened in its top and base regions is obtained. In the case of a cuboid container, a shape which corresponds to the one shown in FIG. 3 should be obtained.

Figure 3:
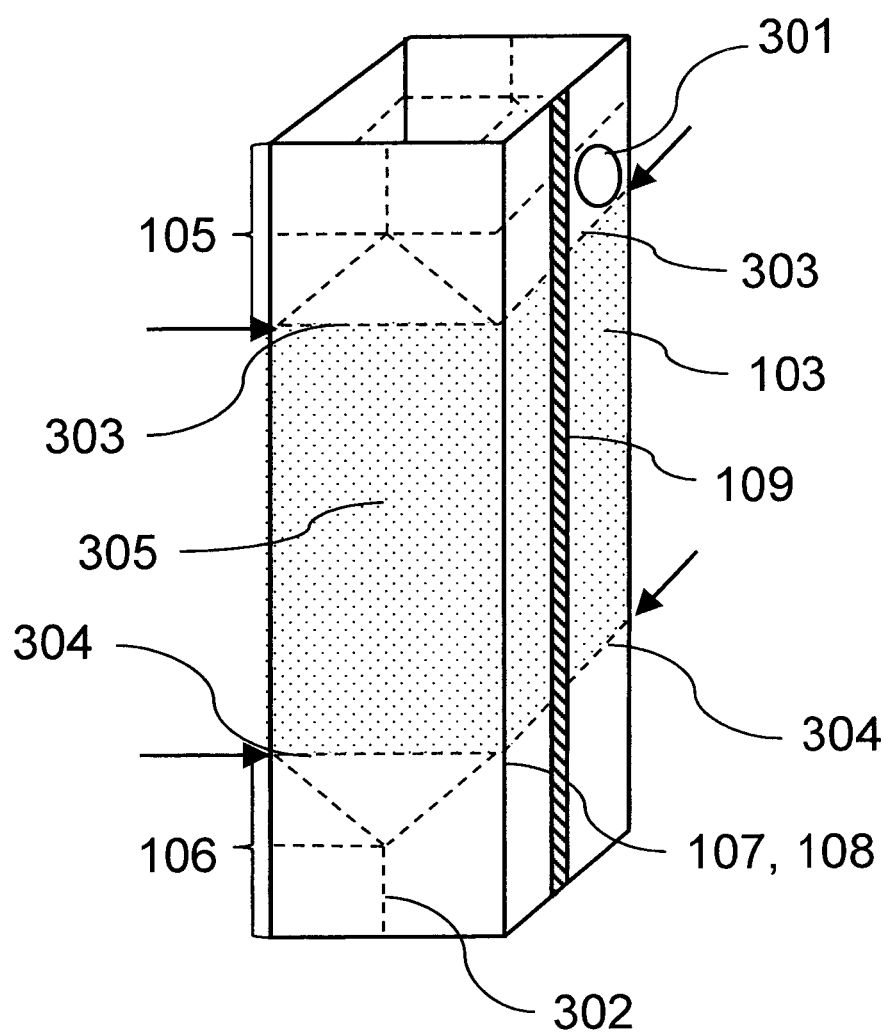

Further, the opened container is folded flat manually by applying a minimum force on opposite lateral side walls of the container. Thereby, the internal angles of two of the longitudinal folds are increased to about 180° and the internal angles of two further longitudinal folds are decreased to about 0°. Then, the top and base regions of the container are cut off using a pair of sharp scissors. Here, the laminate is cut along the fold lines which define the top and base regions with respect to the lateral shell region of the container. FIG. 3 shows in detail along which lines to cut the laminate in order to separate off the top and base regions from the shell region. During the whole procedure of removing the top and base regions, the container is kept in the flat state without applying excessive force onto the longitudinal folds.

Further, the separated shell region of the container is positioned between two plain metal plates of a TIRA test 28025 universal strength testing machine from TIRA GmbH, Schalkau, Germany. This device is used to apply a force of 20 N for a duration of 60 s onto the shell region, thereby keeping the shell region in the flat folded state. The measurement of the shaping force is conducted in direct succession to this preparation as described below.

Shaping Force:

To measure the shaping force, the separated shell region of the container to be studied is clamped in the flat-folded state obtained above between two compression plates of a strength testing machine (TIRA test 28025 universal strength testing machine) from TIRA GmbH, Schalkau, Germany. Herein, the compression plates differ from the above mentioned plain metal plates by having appropriate grooves to accommodate the flat folded shell. Further, as in the "Compression test" method according to DIN EN ISO 12048:2000, in the case of the compression test, a load is applied until a fixed displacement (to be selected according to the container format, typically 30 mm) has taken place. The curve profile is recorded and evaluated with the TIRA test software.

The universal strength testing machine is a motor-driven compression plate system capable of applying a load which results from uniform movement of one of the plates at a relative speed of 10 mm/min±3 mm/min.

Zero Sample Force:

To measure the zero sample force, three specimens of uncreased regions of the laminate (i.e. having no groove) are taken from the container according to German version of DIN EN ISO 186:2002, the sample size being 60 mm×25 mm. These specimens are then analysed by means of an SRT-Win 1.5 die-cut and crease tester from Karl Marbach GmbH & Co. KG, Heilbronn, Germany, according to the operating instructions dated March 2010. This is done by clamping the specimens in a holding clamp developed in-house and placing them onto the turntable. The configuration of the clamp is shown in FIGS. 7 a) and b), 8 a) and b) and 9 a) and b). The evaluation is effected according to DIN 55437-3:2008-05 and DIN 53121:2014-08, the maximum force value over the bending angle range being determined here at bending of up to 150°.

Grammage:

The grammage is determined by taking an uncreased laminate sample of defined size from the container and weighing the sample.

Shaping Coefficient:

The shaping coefficient is defined as follows:

Shaping coefficient=shaping force/(zero sample force·grammage).

This can be represented as:

$$K = \frac{F_{shaping}}{F_{zero\ sample} \cdot G} = \left[\frac{N}{mN \cdot \frac{g}{m^2}}\right] \stackrel{b}{=} 1000000 \ \frac{m^2}{kg}$$

where K is the shaping coefficient, $F_{shaping}$ is the shaping force, $F_{zero\ sample}$ is the zero sample force and G is the grammage. Thus, the unit of the shaping coefficient is $m^2/kg$. The individual parameters of the shaping coefficient are determined as specified above.

Oxygen Permeation Rate

Figure 11:
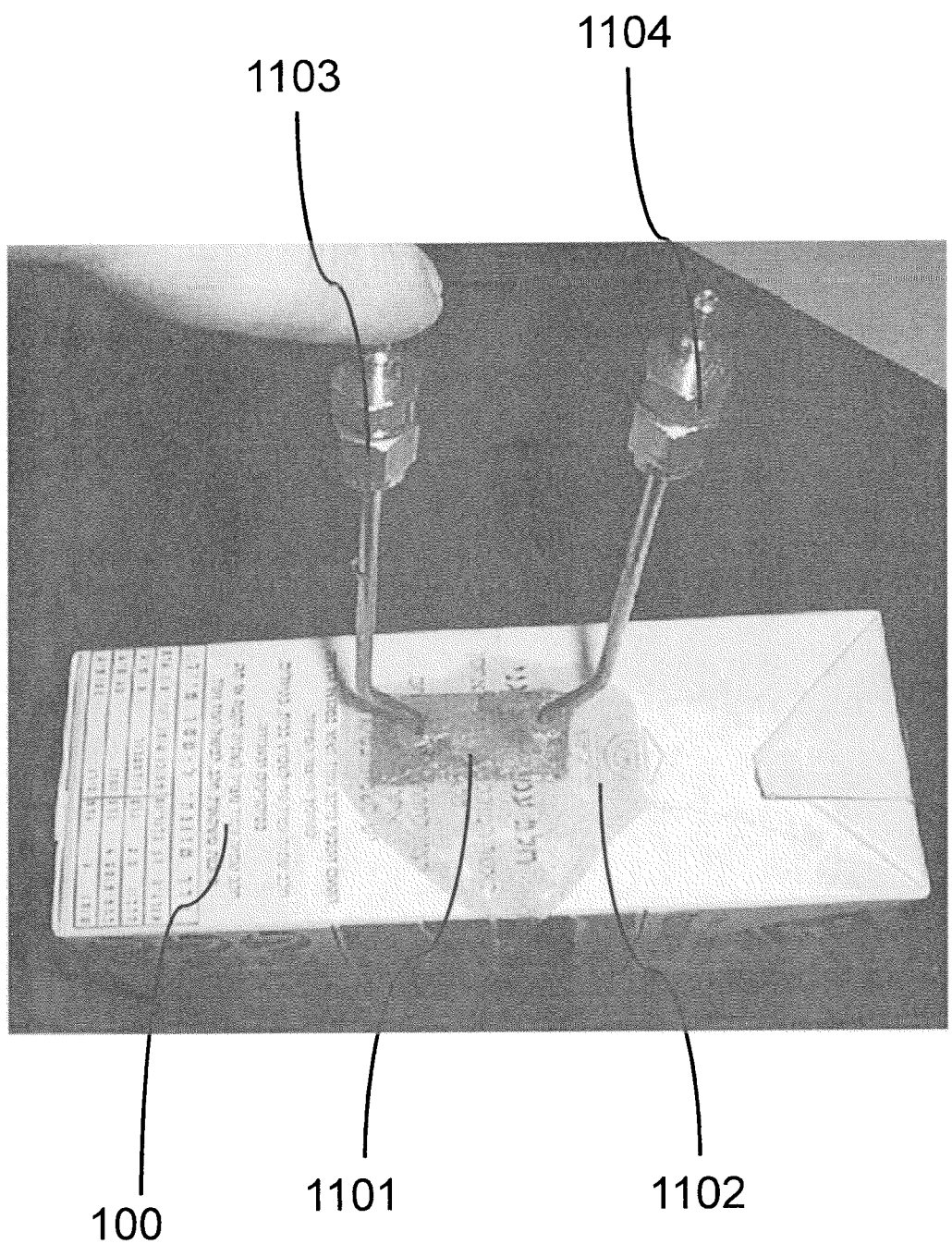

Sample Preparation:

A hole is cut into a side panel of the filled closed container. The dimensions of the hole are 10 mm×40 mm. The container is emptied through the hole. Afterwards, a plate having tubes as gas inlet and gas outlet is put on the hole of the container such that the hole is fully covered by the plate. The gas inlet and the gas outlet extend through the hole into the interior of the container. In order to obtain a gas tight connection between plate and container, an epoxy resin, Devcon 5 Minute® Epoxy by company ITW Engineered Polymers, is used as sealing compound. The resulting setup is shown in FIG. 11. Further, the container is connected to the measurement device Ox-tran Model 2/21, Mocon, Neuwied, Germany via the tubes. The device is operated according to the software which comes along with the device.

Measurement:

Measurement of the oxygen permeation rate is conducted with the Ox-tran Model 2/21 device (Mocon, Neuwied, Germany) and the according software. Therein, the measurement is in accordance with the standards ASTM D3985 (2010), DIN 53380-3 (1998-07), ASTM F-2622, ISO 14663-2 Annex C or ISO 15105-2 (2003-02). Measurement is conducted at 20° C. and 65% relative air humidity for a duration of 24 h. Five containers which are identical in construction and which have been produced identically are prepared and studied as described above and the arithmetic mean is calculated and presented in volume of $O_2$ in ml/(package·year).

Compression Test

The compression force is measured by performing a compression test according to DIN EN ISO 12048:2000 and the standards referred to therein. The test device is a TIRA test 28025 universal strength testing machine from TIRA GmbH. This device meets the requirements given under issue 4 of DIN EN ISO 12048:2000. For the measurements horizontally fixed compressions plates are used. The compression test is further described under issues 3a) and 7 of the aforementioned standard. Therein, the compression test is conducted until the container collapses. The container to be tested is stored under normal conditions (50% relative humidity and a temperature of 23° C.) for 24 hours prior to the measurement. The compression test is performed under the same climatic conditions. For the test the container is placed standing upright between plain metal plates used as compression plates of the test device. The container is compressed vertically with a constant relative velocity of the compression plates of 10 mm/min. During this compression, the force which acts on the container is measured. This force typically increases until the container collapses. The maximum force which is measured is referred to as compression force. For each test, five identical containers are tested and the arithmetic mean of the individual compression forces is calculated as the overall result.

In the examples and comparative examples below, containers of identical dimensions and weight are compared. Further, the containers have been manufactured from laminates of identical construction. All containers have been filled with water. The positions of the points of measurement on the containers are chosen identical for each of the examples and comparative examples.

The invention is described in more detail hereinafter by examples and drawings, although the examples and drawings do not imply any restriction of the invention. Moreover, the drawings, unless stated otherwise, are not to scale.

Laminate Production

For the examples (inventive) and comparative examples (non-inventive), laminates were produced with the following layer sequence by a layer extrusion method with a standard extrusion coating system.

TABLE 1

Layer structure of the laminates used for the examples and comparative examples

| Layer designation | Material | Grammage [g/m²] |
|---|---|---|
| Decorative layer | MAS ink series, SunChemical, Parssippany, USA | / |
| Outer polymer layer | LDPE 23L430 from Ineos GmbH, Cologne | 15 |
| Carrier layer | Cardboard: Stora Enso Natura T Duplex double coated, Scott bond 200 J/m² | 191 |
| Lamination layer | LDPE 23L430 from Ineos GmbH, Cologne | 20 |
| Barrier layer | Aluminium, EN AW 8079 from Hydro Aluminium Deutschland GmbH | here thickness 6 μm |
| Inner polymer layer | LDPE 19N430 from Ineos GmbH, Cologne | 40 |

The laminate is produced with an extrusion coating system from Davis Standard. In the first step, the outer polymer layer is applied to the carrier layer. In the second step, the lamination layer is applied together with the barrier layer to the carrier layer that has been coated with the outer polymer layer beforehand. Next, the inner polymer layer is applied to the barrier layer. For application of the individual layers, the polymers or polymer blends are melted in an extruder. In the case of application of one polymer or polymer blend in a layer, the resultant melt is transferred via a feed block into a nozzle and extruded onto the carrier layer. In the case of application of two or more polymers or polymer blends in a layer, the resultant melts are combined by means of a feed block and then co-extruded onto the carrier layer. Further, the decoration layer is applied by intaglio printing.

Container Production

The laminate obtained by the layer extrusion process is used to manufacture container precursors in the form of jackets. These jackets are of the form shown in FIG. 3. Grooves along which the laminate is to be folded to form the containers are introduced into the laminate by means of a creasing tool. These grooves include longitudinal grooves 1 to 4 per each container to be produced from the laminate. Further, the laminate is cut to size in order to obtain blanks for individual containers. Each blank contains longitudinal grooves 1 to 4. The numbering of the 4 longitudinal grooves used in the following is such that longitudinal grooves 1 to 4 follow each other in this sequence from one longitudinal edge of each blank to the opposite longitudinal edge of the respective blank. Further, 4 longitudinal folds are formed along these longitudinal grooves 1 to 4 by reducing the respective internal angles of the longitudinal folds to 90°. Moreover, a longitudinal seam along which the aforementioned longitudinal edges are bonded to each other is produced by means of heat sealing. The heat sealing is affected by means of an HSG250 heat-sealing unit from Kopp Verpackungstechnik, Esslingen, Germany. The initial pressure is set to 4.5 bar and the sealing temperature to 135° C. For the heat sealing the longitudinal folds 1 and 3 are folded further until the longitudinal edges of the blank come into contact with each other. Therein and for the heat sealing, no pressure is applied to the longitudinal folds 1 and 3, but only to the longitudinal edges.

Further, a TIRA test 28025 universal strength testing machine from TIRA GmbH is used for treatment of the container precursors obtained as described above. This treatment is performed in direction succession of the above heat sealing without any intermediate folding steps. In a first treatment step the container precursor is loaded by placing it completely between the compression plates of the testing machine and applying a first force for a first duration, thereby decreasing the internal angles of the longitudinal folds 1 and 3. In a further step, the container precursor is folded over which means that the internal angles of the longitudinal folds 1 and 3 are increased and the internal angles of the longitudinal folds 2 and 4 are decreased. Here, the container precursor is loaded by placing it completely between the compression plates applying a further force for a further duration, thereby decreasing the internal angles of the longitudinal folds 2 and 4.

In the case of example 1, the first force and the further force are each 200 N and the first duration and the further duration are each 30 s. By applying these loads the internal angles of the longitudinal folds 1 and 3 are each decreased below 10° in the first treatment step and in the further treatment step the internal angles of the longitudinal folds 2 and 4 are decreased below 10° each.

Further, a multitude of container precursors prepared as described above is introduced into an outer transport package. The outer transport package has the dimensions of: length 600 mm; width 110 mm; height 152 mm. This outer package is stored for 5 days before unpacking the container precursors and directly processing them further as described below.

The packages are produced from the container precursors using a CFA 712 standard filling machine from SIG Combibloc, Linnich, Germany. For this purpose, 1000 container precursors were processed on the filling machine for each example and comparative example. Thereby, containers of the cuboid form shown in FIG. 1 are obtained. Each empty container of weight 8.1 g is filled with 200 g of water.

Evaluation

The shaping coefficient, the oxygen transmission rate and the compression force are measured according to the test methods provided above for each example and comparative example after filling with water, closing and storing the packages for 5 days. Therein, in a respective example or comparative example containers which have been obtained identically have been used to determine each of the aforementioned parameters. The results of the measurements are shown in table 2 below. The higher the compression force given in table 2, the better the stability of the container against compression. Containers having a good stability against compression are especially suitable for stacking on a pallet. Starting from the example 1, the shaping coefficients, given in table 2, for the example 2 and the comparative examples have been obtained by varying the above first and further forces as well as the first and further durations accordingly.

TABLE 2

Results of the compression tests and oxygen permeation rate measurements of the examples and comparative examples

| | Shaping coefficient [m²/kg] | Oxygen transmisson rate [ml/(package · year)] | Compression force [N] |
|---|---|---|---|
| Example 1 | 4 | 4 | 110 |
| Example 2 | 5 | 1 | 100 |
| Comparative example 1 | 0.2 | 14 | 110 |
| Comparative example 1 | 15 | 25 | 50 |

Figure 12:
Figure 13:

As can be seen from table 2 and by comparing FIGS. 12 and 13, containers having a shaping coefficient according to the invention show a reduced oxygen transmission in combination with equal or improved compression stability. Hence, containers of the invention are suitable for relatively dense and space-saving storage over relatively long storage times.

Figure 2:
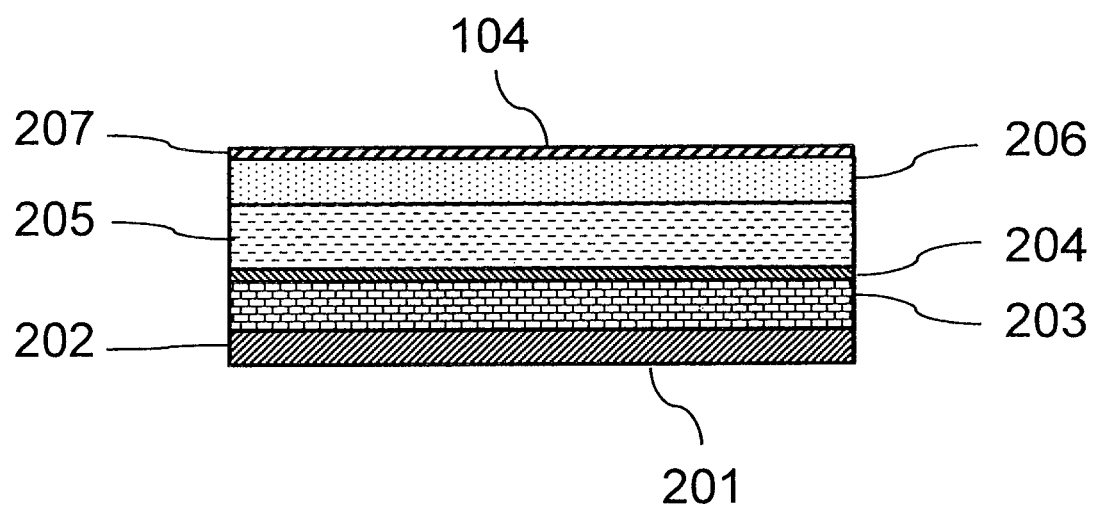
Figure 4:
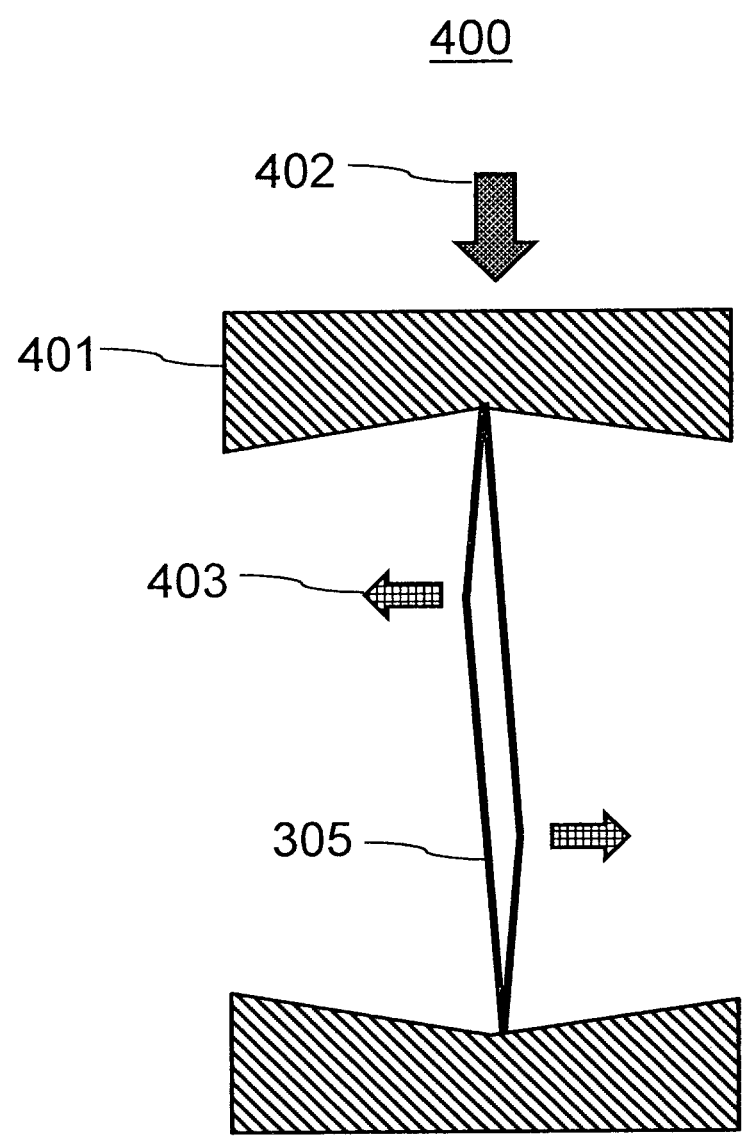
Figure 5:
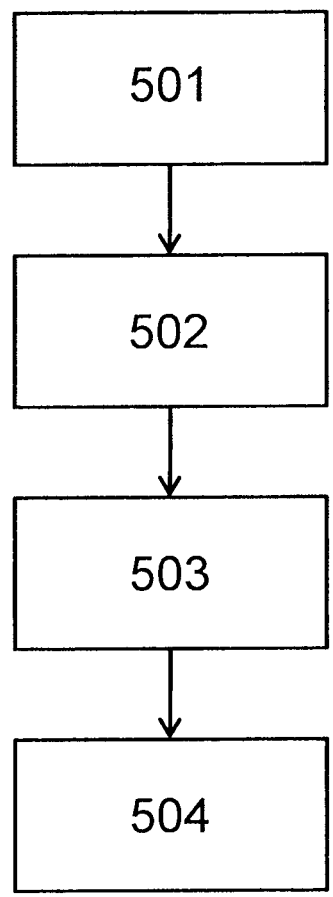
Figure 6:
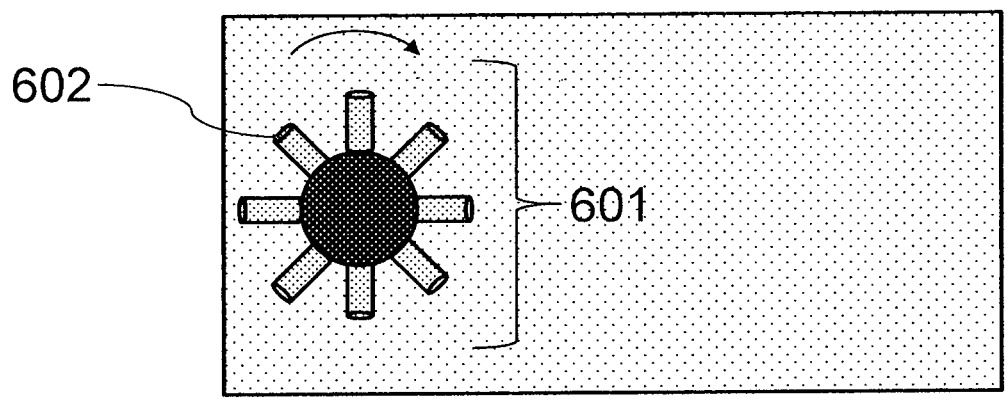
Figure 8A:
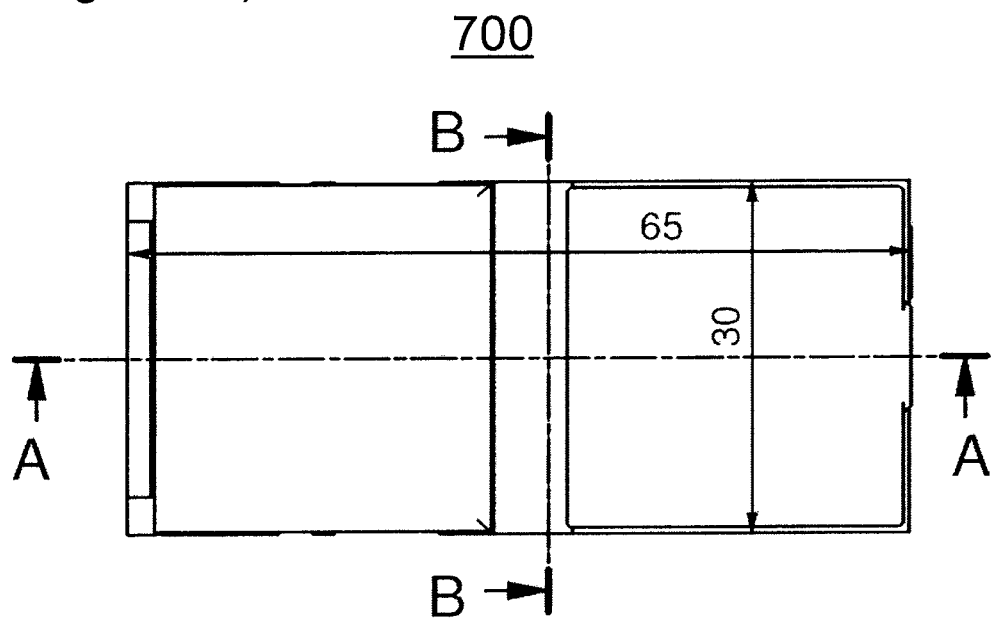
Figure 8B:
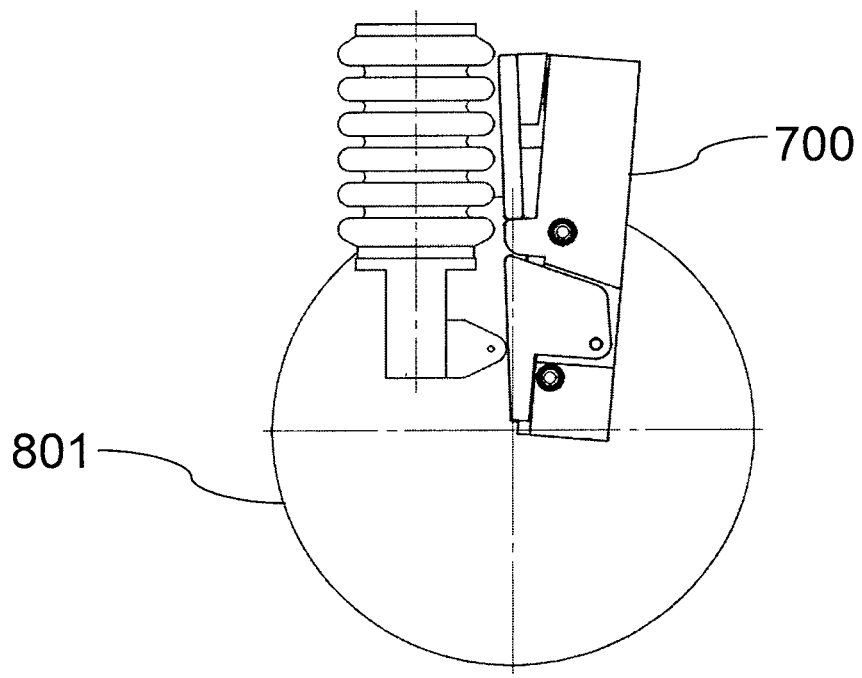
Figure 9A:
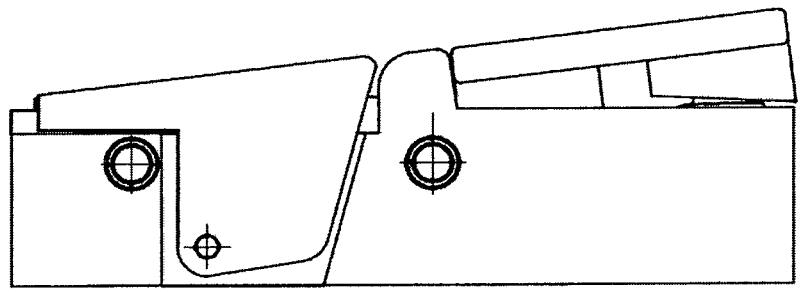
Figure 9B:
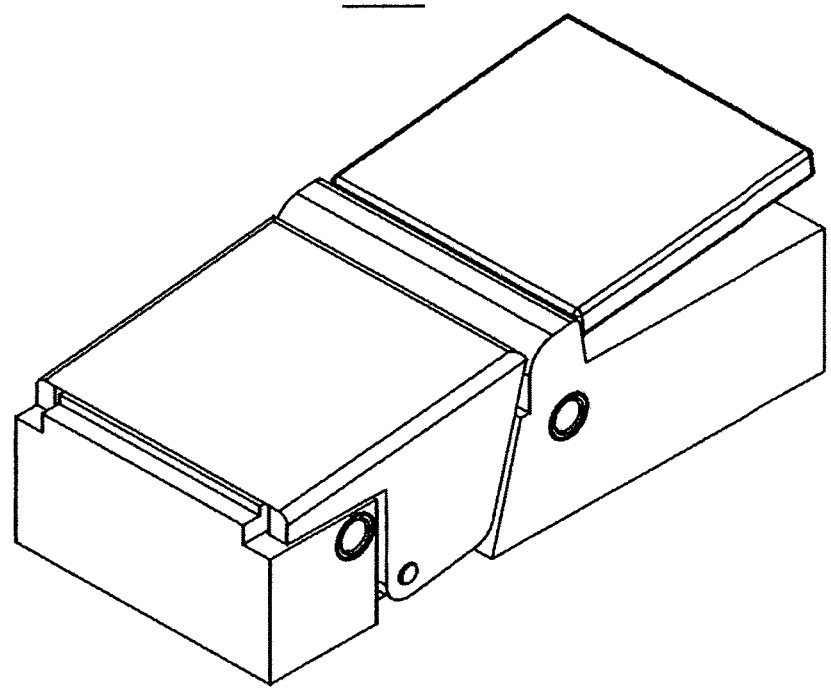
Figure 10:
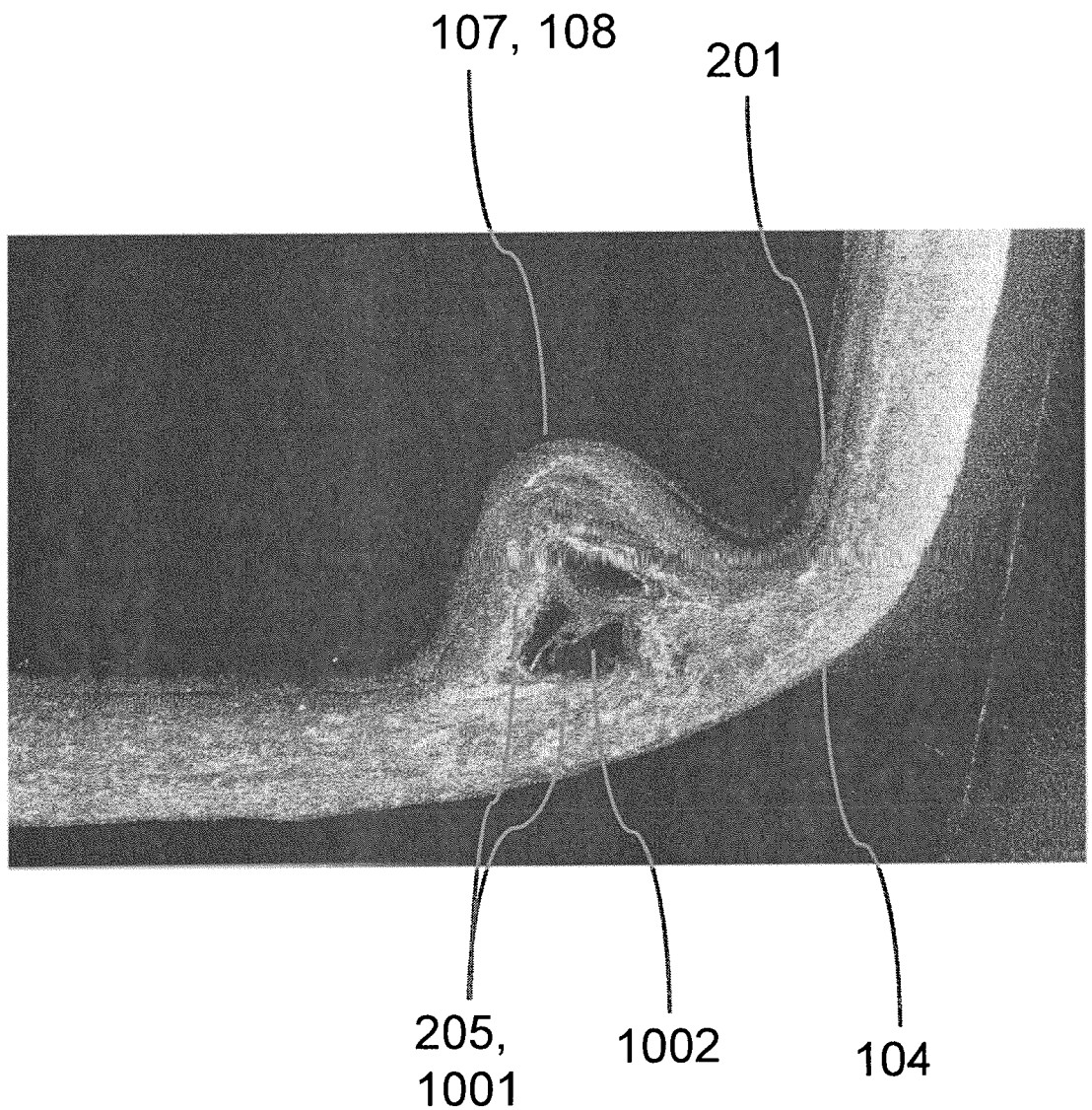

The figures respectively show, in schematic form and not to scale unless stated otherwise in the description or the respective figure:

FIG. 1 a closed container of the invention;

FIG. 2 a layer sequence of the sheetlike composite of the closed container according to FIG. 1 in cross section;

FIG. 3 an opened and emptied container obtained in preparation of measuring the shaping force;

FIG. 4 a scheme of an experimental setup for measuring the shaping force;

FIG. 5 a flow diagram of a method of the invention;

FIG. 6 an apparatus of the invention;

FIG. 7a) a holding clamp;

FIG. 7b) the holding clamp according to FIG. 7a) in a further view;

FIG. 8a) the holding clamp according to FIG. 7a) in a further view;

FIG. 8b) the holding clamp according to FIG. 7a) with a turntable;

FIG. 9a) the holding clamp according to FIG. 7a) in a further view;

FIG. 9b) the holding clamp according to FIG. 7a) in a further view;

FIG. 10 a microscope image of a longitudinal groove in a sheetlike composite of a closed container of the invention in cross section;

FIG. 11 a photograph of an experimental setup for measuring the oxygen permeation rate of a closed container;

FIG. 12 a photograph of a bottom of closed container according to the invention; and FIG. 13 a photograph of a bottom of closed container not according to the invention.

FIG. 1 shows a closed container 100 of the invention. The closed container 100 delimits an interior 101 from an exterior 102 of the container 100. Further, the closed container 100 comprises a sheetlike composite 103 which comprises a layer sequence. This layer sequence is shown in FIG. 2. The closed container 100 of FIG. 1 has a shaping coefficient, determined according to the test method described herein, of 4 m²/kg. The container further comprises a base region 105 and a top region 106. Exactly 4 longitudinal folds 107, which each run along a longitudinal groove 108, extend from the base region 105 to the top region 106. Each of the longitudinal folds 107 has an internal angle of 90°. The container 100 comprises 2 fold protrusions, referred to as ears 113. In FIG. 1, the container 100 is standing upright. Here, the top region 106 is a roof which delimits the closed container 100 in an upward direction and the base region 105 forms a base which is in contact with the ground on which the container 100 stands. Further, the container 100 comprises a longitudinal seam 109 along which opposing longitudinal edges of the sheetlike composite 103 are sealed onto each other. The interior 101 comprises a foodstuff. The foodstuff may be poured from the container 100 via an opening which can be produced by means of an opening aid 112. The opening aid 112 is disclosed in detail in EP1 812 298 B1. The opening aid 112 with a lid is glued to an outer face 104 of the sheetlike composite 103 such that the lid covers a hole in a carrier layer 105 of the sheetlike composite 103. The layer sequence of the sheetlike composite 103 comprises a decoration which comprises a 2D-code 110. This 2D-code 110 is a QR-code which comprises information about the foodstuff in the container 100. Further, the carrier layer 205 is made from cardboard and thus comprises a plurality of fibres. Most of these fibres are oriented in a direction of orientation 111, depicted by arrows in FIG. 1. This direction of orientation 111 forms an angle of orientation with each of the longitudinal folds 7. This angle of orientation is 90°.

FIG. 2 shows a layer sequence of the sheetlike composite 103 of the closed container 100 according to FIG. 1 in cross section. From the inner face 201 of the sheetlike composite 103 to the outer face 104 of the sheetlike composite 103, the layer sequence comprises an inner polymer layer 202 of LDPE 19N430 from Ineos GmbH, Cologne; a barrier layer 203 which is an aluminium foil (EN AW 8079 from Hydro Aluminium Deutschland GmbH); an intermediate polymer layer 204 of LDPE 23L430 from Ineos GmbH, Cologne; a carrier layer 205 made of cardboard (Stora Enso Natura T Duplex double coated, Scott bond 200 J/m²); an outer polymer layer 206 of LDPE 23L430 from Ineos GmbH, Cologne; and, printed thereon, a colour application 207 which comprises a colourant and constitutes the decoration mentioned above with regard to FIG. 1.

FIG. 3 shows an opened and emptied container 300 obtained in preparation of measuring the shaping force. The opened and emptied container 300 shown in FIG. 3 has been obtained by preparing the closed container 100 of FIG. 1 for measuring the shaping force as described in the respective test method above. Therein, the container 100 has been opened using the opening aid 112 and emptied by pouring out the foodstuff through a hole 301 obtained in the sheetlike composite 103. After all seals, except for the longitudinal seal 109, of the container 100 have been opened, the container 300 is in the form of a jacket. In FIG. 3, grooves 302 along which the sheetlike composite 103 had been folded are depicted by dashed lines. Further, a groove 303 along which the sheetlike composite 103 still needs to be cut in order to separate off the top region 106 of the container 300 is shown. Moreover, a groove 304 along which the sheetlike composite 103 still needs to be cut in order to separate off the base region 105 of the container 300 is shown. In addition, arrows indicate where to cut the sheetlike composite 103 in order to obtain the shell region 305 of the container 300 in separate form. This shell region 305 is used to measure the shaping force.

FIG. 4 shows a scheme of an experimental setup 400 for measuring the shaping force according to the test method "Shaping coefficient" as provided above. The shell region 305 prepared as described in the section "Preparation of the container" of the test method is clamped between two compression plates 401 of the compression plate system of the universal strength testing machine. The compression plate system is motor-driven, such that the upper compression plate 401 can execute a uniform downward movement 402. As a result, shaping 403 of the shell region from the flat-folded state takes place to give a jacket structure. Further details relating to the measurement are reported under the section "Shaping force" of the test method.

FIG. 5 shows a flow diagram of a method 500 of the invention. In a method step a) 501 of the method 500 a container precursor is provided. The container precursor comprises a sheetlike composite 103, having the layer sequence shown in FIG. 2. In a method step 502 the container precursor is filled with a foodstuff; and in a method step c) 503 the container precursor is closed by sealing, thereby obtaining a closed container 100 according to the invention. This container 100 has a shaping coefficient of 3 $m^2/kg$. The method 500 further comprises a method step d) 504, of bonding an opening aid 112 to the closed container 100.

FIG. 6 shows an apparatus 600 of the invention. The apparatus 600 is a filling machine comprising a mandrel wheel 601 with several mandrels 602. In a production cycle comprising production of a container 100 from a container precursor and filling of the container 100 with a foodstuff and closing of the container 100, the flat-folded container precursor is shaped and placed onto a mandrel 602 of the mandrel wheel 601.

FIG. 7a) shows a holding clamp 700. The holding clamp 700 is an in-house development which serves for performance of the above-described test method for the zero sample force. FIG. 7a) shows a section A-A through the holding clamp 700. The holding clamp especially includes a holding plate 1, a clamp 2, a lever 3, a barrel 4, a spacer ring 5, a bolt 6, a cylinder pin 7 and a compression spring 8.

FIG. 7b) shows the holding clamp 700 according to FIG. 7a) in a further view What is shown is a section B-B through the holding clamp 700.

FIG. 8a) shows the holding clamp 700 according to FIG. 7a) in a further view with dimensions in mm.

FIG. 8b) shows the holding clamp 700 according to FIG. 7a) with a turntable 801. The holding clamp 700 and the turntable 801 are used in this arrangement for the zero sample force test method as described above.

FIG. 9a) shows the holding clamp 700 according to FIG. 7a) in a further view

FIG. 9b) shows the holding clamp 700 according to FIG. 7a) in a perspective view.

FIG. 10 shows a microscope image of a longitudinal fold 107 along a longitudinal groove 108 in a sheetlike composite 103 of a closed container 100 of the invention in cross section. It can be seen clearly that the longitudinal groove 108 has a bulge on the inner face 201 of the sheetlike composite 103. The recess on the outer face 104 is not visible here. In addition, the carrier layer 205 is split into 2 separate sublayers 1001 along the longitudinal groove 108. Between the two sublayers 1001, the carrier layer 205 forms a cavity 1002.

FIG. 11 shows a photograph of an experimental setup for measuring the oxygen permeation rate of a closed container 100 according to the above test method. The plate 1101 having the gas inlet 1103 and the gas outlet 1104 can be seen. The plate 1101 is glued to the container 100 in a gas tight manner via the sealing compound 1102.

FIG. 12 shows a photograph of a bottom of closed container 100 according to the invention. What is shown is the bottom of a container 100 according to example 1 after storing the container 100 for 5 days on a pallet of 6 containers 100 stacked above each other. Therein, the container 100 of FIG. 12 had been stored in the lowermost position of the stack.

FIG. 13 shows a photograph of a bottom of closed container not according to the invention. What is shown is the bottom of container according to comparative example 2 after storing the container for 5 days on a pallet of 6 containers stacked above each other. Therein, the container of FIG. 13 had been stored in the lowermost position of the stack. By comparison to FIG. 12, it can clearly be seen that containers 100 according to the invention are more suitable for storage in stacks.

LIST OF REFERENCE NUMERALS

100 Closed container of the invention
101 Interior
102 Exterior
103 Sheetlike composite
104 Outer face
105 Base region
106 Top region
107 Longitudinal fold
108 Longitudinal groove
109 Longitudinal seam
110 2D-code
111 Direction of orientation
112 Opening aid with a lid
113 ear
201 Inner face
202 Inner polymer layer
203 Barrier layer
204 Intermediate polymer layer
205 Carrier layer 206 Outer polymer layer
207 Colour application/decoration
300 Opened and emptied container in preparation of measuring the shaping force
301 Opening
302 Groove
303 Groove along which to cut for removal of the top region
304 Groove along which to cut for removal of the base region
305 Shell region of the container
400 Experimental setup to measure the shaping force
401 Compression plate
402 Uniform compression plate movement
403 Shaping
500 Method of the invention
501 Method step a)
502 Method step b)
503 Method step c)
504 Method step d)
600 Apparatus of the invention
601 Mandrel wheel
602 Mandrel
700 Holding clamp
1 Holding plate
2 Clamp
3 Lever
4 Barrel
5 Spacer ring
6 Bolt
7 Cylinder pin
8 Compression spring
801 Turntable
1001 Sublayer
1002 Cavity
1101 plate
1102 sealing compound
1103 gas inlet
1104 gas outlet

The invention claimed is:

1. A closed container, delimiting an interior from an exterior, wherein the closed container comprises a sheetlike composite;
wherein the sheetlike composite comprises a layer sequence, comprising as mutually superposed layers in a direction from an inner face of the sheetlike composite to an outer face of the sheetlike composite
a) an inner polymer layer,
b) a barrier layer, and
c) a carrier layer;
wherein the closed container is characterised by a shaping coefficient, determined according to the method described herein, in the range from 1.0 to 10.0 m²/kg.

2. The closed container according to claim 1, wherein the closed container further comprises
a. a base region;
b. a top region; and
c. at least four longitudinal folds, each extending from the base region to the top region.

3. The closed container according to claim 2, wherein the carrier layer of the sheetlike composite comprises an oriented material,
wherein the oriented material is characterized by a direction of orientation,
wherein the direction of orientation forms an angle of orientation at least with a section of at least one of the at least four longitudinal folds,
wherein the angle of orientation is in a range from 60 to 120°.

4. The closed container according to claim 1, wherein on a side facing away from the barrier layer the carrier layer is superimposed by a colour application.

5. The closed container according to claim 4, wherein the colour application adjoins the carrier layer.

6. The closed container according to claim 4, wherein the colour application comprises a 2D-code.

7. A method, comprising as method steps
a) providing a container precursor, comprising a sheetlike composite, comprising a layer sequence, comprising as mutually superposed layers in a direction from an inner face of the sheetlike composite to an outer face of the sheetlike composite
i) an inner polymer layer,
ii) a barrier layer, and
iii) a carrier layer;
b) filling the container precursor with a foodstuff; and
c) closing the container precursor, thereby obtaining a closed container;
wherein the closed container is characterised by a shaping coefficient, determined according to the method described herein, in the range from 1.0 to 10.0 m²/kg.

8. A closed container, obtainable by the method according to claim 7.

9. The method according to claim 7, wherein in the method step a) the container precursor comprises at least two longitudinal folds.

10. The method according to claim 9, wherein the carrier layer of the sheetlike composite comprises an oriented material,
wherein the oriented material is characterized by a direction of orientation,
wherein the direction of orientation forms an angle of orientation at least with a section of at least one of the at least two longitudinal folds,
wherein the angle of orientation is in a range from 60 to 120°.

11. The method according to claim 7, wherein on a side facing away from the barrier layer the carrier layer is superimposed by a colour application.

12. The method according to claim 11, wherein the colour application adjoins the carrier layer.

13. The method according to claim 11, wherein the colour application comprises a 2D-code.

14. An apparatus, designed for producing the closed container according to claim 1 from a container precursor.

15. A use of a sheetlike composite for producing the closed container according to claim 1.

16. A use of the closed container according to claim 1 for storing a foodstuff.

* * * * *